United States Patent [19]
Dion et al.

[11] Patent Number: 6,163,856
[45] Date of Patent: Dec. 19, 2000

[54] METHOD AND APPARATUS FOR FILE SYSTEM DISASTER RECOVERY

[75] Inventors: David Dion, Seattle, Wash.; Yousef A. Khalidi, Cupertino, Calif.; Madhusudhan Talluri, Freemont, Calif.; Anil Swaroop, Loma Linda, Calif.

[73] Assignee: Sun Microsystems, Inc., Palo Alto, Calif.

[21] Appl. No.: 09/087,786

[22] Filed: May 29, 1998

[51] Int. Cl.$^7$ ........................................... G06F 11/00
[52] U.S. Cl. .................................. 714/4; 709/213
[58] Field of Search .................. 714/4, 1–3, 5, 714/7, 8, 11, 12, 13, 15, 16, 21, 25, 31, 39, 41, 42, 43, 47, 48, 769, 770; 395/617, 200.01, 200.57, 200.54; 709/213, 201; 707/10; 711/114, 115

[56] References Cited

U.S. PATENT DOCUMENTS

| | | | |
|---|---|---|---|
| 5,077,658 | 12/1991 | Bendert et al. | 395/600 |
| 5,201,044 | 4/1993 | Frey, Jr. et al. | 395/575 |
| 5,513,314 | 4/1996 | Kandasamy et al. | 395/182.04 |
| 5,564,011 | 10/1996 | Yammine et al. | 395/182.13 |
| 5,649,195 | 7/1997 | Scott et al. | 395/617 |
| 5,675,510 | 10/1997 | Coffey et al. | 364/514 A |
| 5,682,527 | 10/1997 | Cooper et al. | 395/618 |

(List continued on next page.)

FOREIGN PATENT DOCUMENTS

| | | |
|---|---|---|
| 86111955 | 8/1986 | European Pat. Off. . |
| 9912740 | 1/2000 | United Kingdom . |

OTHER PUBLICATIONS

"Solaris MC File System Framework", Vlada Matena, Yousef A. Khalidi, Ken Shirriff, 20 pages, Oct. 1996, Sun Microsystems Laboratories, SMLI TR–96–57.

"White Paper–NFS", 12 pages, ©1994–1997 Sun Microsystems, Inc. Palo Alto CA 94303, http://www.sun.com/solaris/wp-nfs/nfs 18.html.

"Building Distributed Process Management on an Object-Oriented Framework", Ken Shirriff, Sun Microsystems, 16 pages, Jan. 12, 1998, http://www.sunlabs.com/research/solaris-mc/doc/process-usenix.doc.html.

"Using DFS Without DCE/LFS (Episode)", Chuck E. Lever, 7 pages, Jan. 1994, Center for Information Technology Integration: Technical Report Series 1986–1997, Report 94–2.

"DFS Server for Window NT", Transarc, Pittsburgh PA 15219, 4 pages, Jan. 12, 1998, http://www.transarc.com/afs/transarc.com/public/www/Public/ProdServ/Product/DFS/dfsnt/dfsservent.html.

*Primary Examiner*—Robert W. Beausoliel, Jr.
*Assistant Examiner*—Nadeem Iqbal
*Attorney, Agent, or Firm*—Pennie & Edmonds LLP

[57] ABSTRACT

A file disaster recovery system that employs geographical replication of data from a local site to remote site in a such a manner that file requests from clients of the local site can be handled by a file server on the remote site following a failover from the local site to the remote site. Geographical data replication software running on a local server checkpoints to a log in local stable storage all information on file operations that change the file state of the local file system. According to a selected mode, the local geographical data replication software flushes information in the log pertaining to the file operations since the last flush to the remote site. At the remote site, compatible remote geographical data replication software running on a remote file server receives the flushed log and replicates in sequence order the file operations represented in the flushed log. The results of the operations are stored on remote stable storage. The local and remote servers can be clusters or single servers. There is no need for commonality, except for operating and file systems, between the local and remote sites. Because operations are replicated and not low level, formatted data, the local and remote stable file storage can be completely different.

43 Claims, 10 Drawing Sheets

U.S. PATENT DOCUMENTS

| | | | |
|---|---|---|---|
| 5,689,706 | 11/1997 | Rao et al. | 395/617 |
| 5,765,151 | 6/1998 | Senator | 707/8 |
| 5,832,222 | 11/1998 | Dziadosz et al. | 395/200.46 |
| 5,878,434 | 3/1999 | Draper et al. | 707/202 |
| 5,893,140 | 4/1999 | Vahalia et al. | 711/118 |
| 5,909,540 | 6/1999 | Carter et al. | 395/182.02 |
| 5,913,160 | 6/1999 | Leung | 455/403 |
| 5,937,343 | 8/1999 | Leung | 455/403 |
| 5,940,826 | 8/1999 | Heideman et al. | 707/8 |
| 5,948,062 | 9/1999 | Tzeinic et al. | 709/219 |
| 5,951,695 | 9/1999 | Kolovson | 714/16 |
| 5,966,706 | 10/1999 | Biliris et al. | 707/10 |
| 5,987,506 | 11/1999 | Carter et al. | 709/213 |
| 5,987,621 | 11/1999 | Duso et al. | 714/4 |
| 5,991,771 | 11/1999 | Falls et al. | 707/202 |
| 6,016,553 | 1/2000 | Schneider et al. | 714/21 |

METHOD AND APPARATUS FOR FILE SYSTEM DISASTER RECOVERY

BACKGROUND OF THE INVENTION

Computer systems are subject to any number of operational and environmental faults, ranging from disk failures and power outages to earthquakes and floods. While repair or replacement of damaged equipment is costly, the interruption of access to critical data may be far more severe. For this reason, businesses are taking great precautions to ensure the availability of their data.

The simplest guard against failure is replication. By replicating a system component, a spare is ready to take over if the primary should fail. Replication can occur at many levels, according to the faults it guards against.

The simplest way to replicate only data is with tape backups. Tape backups are a popular replication strategy because they are simple and inexpensive. They ensure that data is safe if a disk or entire machine is damaged or destroyed. Further, if tapes are taken off-site or stored in a protective vault, tape backups can protect data against site-wide disasters. However, tape backups only guard against the ultimate unavailability - data loss. Restoring data from a tape can take hours, or even days, and all changes since the most recent tape backup are lost.

Replicating disks, through widespread strategies such as RAID, protects against the failure of a single disk. Many vendors offer disk replication solutions that are efficient and easy to manage. With disk replication, recovery from a disk failure can be fast and invisible to applications. However, disk replication does not account for the failure of the host machine or destruction of the entire site. In conjunction with tape backups, data loss can be prevented, but availability will suffer with higher-level failures.

Replication of a server machine protects against hardware and software errors on the data server. Disks can be dual-ported, allowing more than one machine direct access to raw data. Along with disk replication strategies, a replicated server can provide high availability even after single disk and single server failures. Just as with replicated disks, tape backups can guard against data loss in a site-wide failure, but extended downtime will still occur.

Replicating an entire site across extended distances, called "geographic replication," increases data availability by accounting for site-wide faults, such as extended power outages, fires, earthquakes, or even terrorist attacks. In a geographic replication system, normal system operation occurs at a local site. Data is mirrored to a remote site, which can take over system functions if the local site is lost. Geographic replication does not mirror application address spaces or any other volatile memory; only data written to stable storage devices is transmitted to the remote site. Distributing cluster storage across extended distances is complex and time-consuming; consequently, failover to the remote site cannot be performed as efficiently and invisibly as failover to a secondary server or hot-swapping a new disk into a storage array. Geographic replication provides blanket protection for high availability; i.e., when all other techniques fail, a complete site failover can still occur under a geographic replication regime.

A generic geographic replication system 100 is shown in FIG. 1. This system has a local site 102 comprising a file server 104, file storage 106 (e.g., a hard disk drive), and clients 108, 110. Note that the term "local" as used in the present application is relative; i.e., the local site is simply the site whose server normally serves the clients 104. The local site 102 is coupled to a remote site 112, possibly by a wide area network (WAN). The remote site 112 includes a file server 114 and file storage 116. Data is mirrored from the local disk 106 to the remote disk 116 in the course of normal operation of the local server 104 so that, if a failure should occur, the remote server is able to serve file requests from the clients 108 or 110 with minimal or no loss of file system state.

A geographic replication system must be able to capture all state changes (hereafter referred to as writes) to file systems and raw devices. Self-consistency must always be maintained at the remote site. Even if the remote site is not current with the primary site, it must be internally consistent. Geographic replication of data must be invisible to applications. The replication system must support at least two levels of data safety: 1-safe and 2-safe (for more information, see Jim Gray and Andreas Reuter, "Transaction Processing: Concepts and Techniques," Morgan Kaufmann, San Francisco, Calif., 1993, which is entirely incorporated herein by reference).

In 1-safe, or asynchronous, mode, a replication system logs operations at the primary site and periodically replicates the data to the remote site. In 1-safe mode, the log of operations not yet applied to the remote site must be serializable and consistent with the operations applied to the local site. Thus, although the remote site may lag behind the local site, it is almost impossible for an operation to be applied at the remote site that was not applied to the local site, and it is almost impossible for operations to be applied at the remote site in a different order than they were applied at the local site. At start-up, the local and remote must automatically synchronize their data so that any future mutually applied operations result in identical states. The geographic replication system must be compatible with any replication services provided by database (for more information, see Oracle, "Oracle7 Distributed Database Technology and Symmetric Replication," available at: http://www.oracle.com/products/oracle7/server/whitepapers/replication/html/index.html) or other applications. 2-safe, or synchronous, mode copies data to the remote site before an operation on the local site is allowed to complete. The replication system could also support an additional level of data consistency called very safe mode. Very safe mode enhances 2-safe mode, adding a two-phase commit protocol to ensure consistency between the local and remote sites. The synchronization (or resynchronization) of local and remote sites that occurs in very safe mode should not require the local site to be taken off-line. Read-only access to the remote site should be available during normal operation. The replication service should automatically configure and start itself at system boot. This can be accomplished using boot scripts and user-level programs that invoke the replication API. The replication service should provide file deletion protection.

Replicating data across geographically separated sites is not a new idea. Several vendors already offer geographic replication solutions, which are now briefly described.

EMC

EMC supports geographic replication in its Symmetrix product (for more information, see EMC, "Symmetrix 3000 and 5000 ICDA Product Description Guide," available at: http//Iwww.emc.com/products/hardware/enterprise/new5000/new5000. htm and EMC, "SRDF—Symmetrix Remote Data Facility," available at: http:// www.emc.com/products/softwarelbuscont/srdf/srdf 2.htm). Symmetrix is a storage hardware unit compatible with Sun servers and the Solaris operating system. The Symmetrix Remote Data Facility (SRDF) provides geographic replication for Symmetrix customers. SRDF requires use of a Symmetrix storage system at both the local and remote sites. The local Symmetrix unit is connected to the remote Symmetrix unit with an ESCON fibre link. Basic ESCON links are limited to 60 kilometers, but with an additional device on the sending and receiving ends, ESCON data can be transmitted over wide area networks.

SRDF is. implemented entirely within the Symmetrix unit. Writes are applied to the disk on the local site and transmitted to the remote site along the ESCON link either synchronously or non-synchronously, depending on the mode of operation. SRDF documentation makes no mention of a stable log, meaning that transactions might be lost if a crash occurs before transmission can occur.

Further, SRDF is not well suited for long distances with respect to performance. SRDF supports non-synchronous replication in two ways: semi-synchronous and adaptive copy. In adaptive copy mode, data is transferred from the local site to the remote site with no return acknowledgments. In semi-synchronous mode, an I/O operation is performed at the local site, after which control is returned to the application. The written data is then asynchronously copied to the remote site. No other write requests for the affected logical volume are accepted until the transfer of the initial request has been acknowledged. Since SRDF is implemented in the storage unit, I/O operations are expressed as low-level SCSI or ESCON directives. A write system call could translate to several commands to the storage system, some modifying data and others modifying file system metadata. If each of these individual commands must be acknowledged across a wide area network before the next can proceed, performance at the local site will suffer.

SRDF does include a synchronous mode of operation. Updates are first applied to the local site. The data is then transmitted to the remote site. The operation on the local site cannot return until an acknowledgment has been received from the remote site. This synchronous mode is 2-safe, but not very safe. If the local site were to fail after committing the update but before transmitting it to the remote site, then the two sites would be inconsistent. Further, SRDF provides no log by which to determine the transactions that were lost in a site failure.

Implementing replication at such a low-level has other disadvantages. First, since SRDF connects two Symmetrix storage units, only the storage system is replicated at the remote site. If a disaster incapacitates the local site, a server will have to be bootstrapped at the remote site, reconstructing the file system, before data will be available. A second problem with the low-level approach is that replication occurs on the granularity of entire volumes, rather than files and directories. Also, the hardware for mirrored volumes must be symmetric at the two sites. Finally, SRDF is a mixed hardware and software solution—all components of the storage system must be purchased from EMC.

Uniq

Uniq takes a high-level approach to replication with a new file system called UPFS (for more information, see Uniq Software Services, "UPFS—A Highly Available File System," Jul. 21, 1997, White Paper Available at: http://www.uniq.com.au/products/upts/UPFS-WhitePaper/UPFS-WhitePaper-1.htmi). Based on VFS, UPFS does not require specialized hardware. It transparently manages several file systems in parallel, locally using native file systems and remotely using NFS. Thus, geographic replication is performed using NFS protocols over Unix networking protocols.

Unfortunately, NFS may not be ideally suited for geographic replication. NFS protocols do not provide good utilization of a wide area network. For instance, name lookup occurs one component at a time. Opening a file deep in the directory hierarchy requires a large number of RPCs, incurring a significant latency over an extended distance. Also, every successful write operation returns a complete set of file attributes, consuming precious bandwidth (for more information, see Nowicki, Bill, "NFS: Network File System Protocol Specification," RFC 1094, March 1989, available at: http://www.internic.net/rfc/trfc 1094.txt). Another potential shortcoming of NFS is that it does not support exporting and mounting of raw devices. For efficiency, many databases operate on raw devices rather than files in a structured file system. Since NFS does not support operations on raw devices UPFS cannot provide geographic replication for these products.

In addition, Uniq makes no mention of 2-safe or very safe capabilities. Replication is performed asynchronously to optimize performance on the local site.

Qualix

Qualix implements geographic replication with its DataStar product (for more information, see Qualix, "Qualix DataStar Primer and Product Overview," April, 1997, White Paper available at: http://www.qualixcom/html/datastar_wp.html). DataStar uses a special Solaris device driver installed between the file system and regular device drivers to intercept writes to raw and block devices. DataStar logs these writes, and periodically a daemon process transmits the log to the remote site via TCP/IP. The log is chronologically ordered for all disk volumes within user-defined logical groups.

DataStar captures I/O commands below the file system, which controls the layout of data and metadata on the disk volume. This requires a restriction on the symmetry of the local and remote sites. Specifically, a replicated logical device on the local site must be mapped to a logical device on the remote site, and, of course, the device on the remote site must be at least as big as the device on the local site. The one-to-one mapping is not considerably restrictive until a change is necessary. For instance, enlarging a replicated file system or adding new replicated file systems could require disruptive repartitioning at the backup site.

Qualix makes no mention of 2-safe or very safe modes of operation. However, DataStar logs replicated operations at the local site, allowing a retrieval of the transactions that were lost in a site failure.

DataStar shares another characteristic with other low-level approaches to replication in that decisions must be made on the granularity of entire volumes rather than directories or files.

SUMMARY OF THE INVENTION

In summary, the present invention is a file system disaster recovery system that employs geographical replication of data.

In particular, the present invention is a geographical data replication system that enables selected file system data to be replicated from a local site to a remote site such that, when the local site fails, clients of the local site are able to resume file operations at the remote site with little or no loss of file state. Many features of the present invention are embodied in geographical replication software executed on both the local and remote sites. At the local site, the software selects the file system data to be replicated and transfers the data to the remote site according to a particular transfer mode. At the remote site, the software logs and stores the transferred data so that local site operations can be transitioned to the remote site.

Common aspects of preferred embodiments are described in terms of system—topology, functionality, failure characteristics, administration and performance; these terms are defined in the detailed description.

A preferred embodiment of the geographical replication system includes interconnected remote and local file servers, each running the geographical replication software of the present invention, compatible operating systems and respective file systems (the same or different). Each site has associated stable file storage, such as one or more hard disks or tape storage units. The geographical replication software running on the local site intercepts all file system requests issued by local clients. The software determines whether a requested operation will modify the file system (e.g., file writes) and, if so, attempts to replicate the operation to the remote site. The system operates in a particular mode (either 1-safe, 2-safe or very-safe) that determines whether the local site software merely passes the file system request to the local file system following a replication attempt (1-safe mode) or delays handing off the request to the local file system until it has heard from the remote site software that the replication operation was complete (2-safe, very safe).

The replication software transfers only file system data, which includes file system operations, files and partitions and excludes application state. Because the software transfers only file system data, the replication system can be configured to replay file system operations at any level of the file system. For example, in one preferred embodiment the local and remote file systems can include four levels: a distributed/cluster file system (PXFS), a Unix file system (UFS) and device drivers, such as a volume manager (VM) and a SCSI driver (SD). In such a system the PXFS, UFS, VM or SD operations can be replicated to and replayed on the remote site. Moreover, because operations are being replicated and not application state, there is no need for the file storage to be similarly formatted, or the file systems to be identical, or the servers to be similarly configured (e.g., either or both of the servers could be a cluster or a single server).

In a preferred embodiment the file servers typically include a cache where file data in active use is maintained until it is written back to the file storage. The software interacts with the cache so that it replicates file system operations only when those operations are actually being written from the cache to the file storage.

A preferred embodiment can be configured to operate in the context of a high availability file system where a primary server (e.g., the file server mentioned above) operates in cooperation with a secondary server. When configured in this manner, the primary and secondary servers are each coupled to the stable file storage, which is dual ported. The primary server responds to file system (e.g., PXFS) requests from clients and checkpoints all necessary information (including application state) to the secondary so the secondary can take over operations even in the case of a minor failure by the primary server. Both the primary and secondary servers are configured to execute the replication software as described above; however, the software only executes in the server that is online. In the prior art, the primary and the secondary servers communicate using a high availability file system protocol (e.g., Sun HA-PXFS). The present invention modifies the checkpoint information transferred between the primary and secondary under HA-PXFS so the secondary can execute the replication software in-case the primary goes down.

In any of the embodiments, the file storage can be distributed or singular. For example, in an embodiment where a file server includes a cluster of personal computers, each with a single ported disk, the file storage can be distributed across any subset of the disks. This is enabled in the present invention by the fact that client requests are made to the file servers using a distributed file system (PXFS).

BRIEF DESCRIPTION OF THE DRAWINGS

Additional objects and features of the invention will be more readily apparent from the following detailed description and appended claims when taken in conjunction with the drawings, in which:

DESCRIPTION OF PREFERRED EMBODIMENTS

Figure 1:
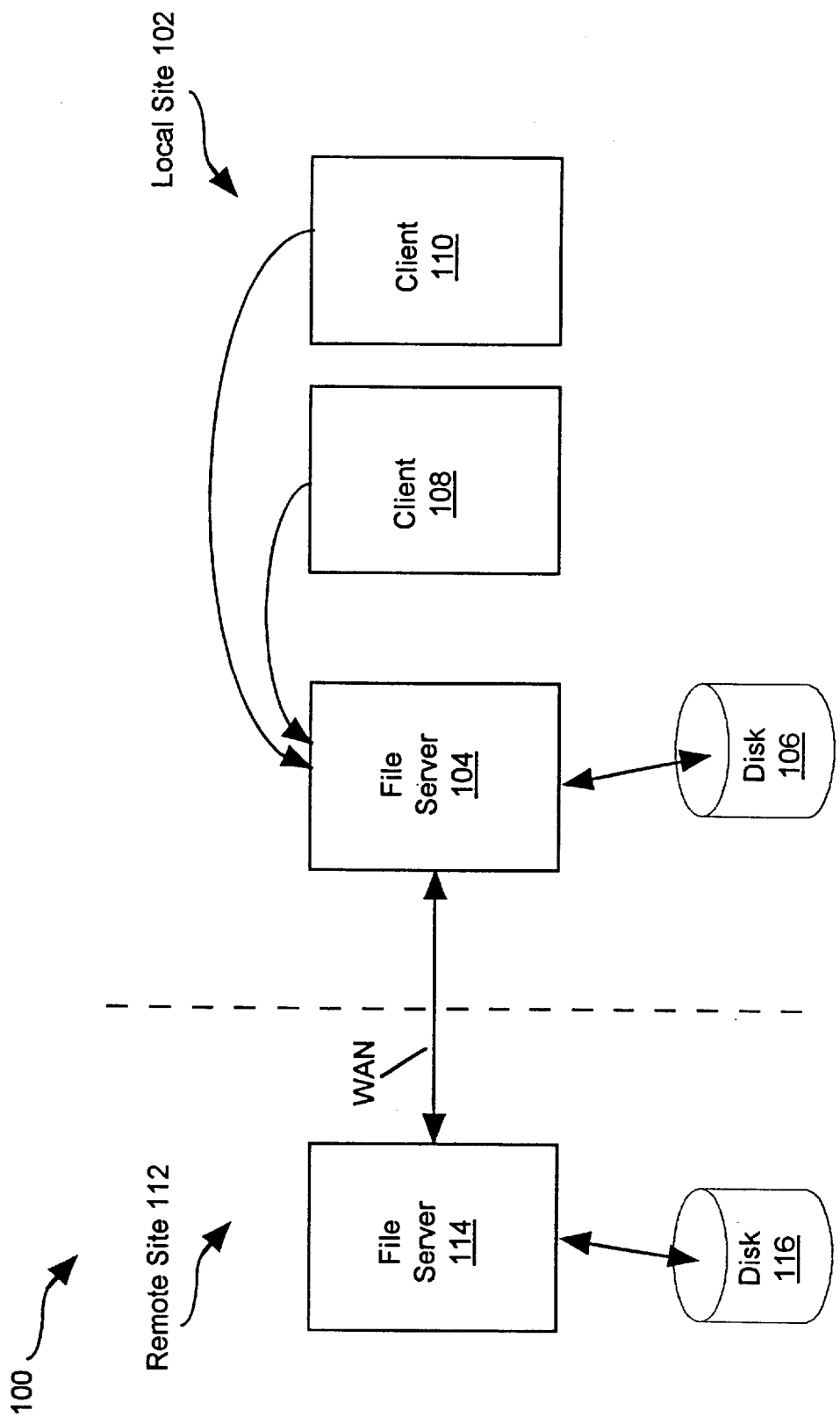
FIG. 1 is a block diagram of a generic geographic replication system architecture.

Common aspects of preferred embodiments are described in terms of system topology, functionality, failure characteristics, administration and performance; these concepts are now defined.

Topology

The topology of a geographic replication system is the way in which its components are assembled. The topology of preferred embodiments allows arbitrary distance between the remote and local sites. That is, the location of each site is limited only by the reach of the network to which the sites are connected. Additionally, apart from the requirements that there must be sufficient storage space on the remote site for the replicated data and the two sites must be capable of running compatible versions of geographic replication software in which the present invention is embodied, the local and remote sites need not have symmetrical hardware. The present system can also be configured to allow arbitrary groupings of multiple local sites and multiple remote sites.

That is, a local site can replicate data to more than one remote site, and a remote site can backup data for more than one local site. Moreover, the geographical replication software can be configured to support a variety of network protocols and to be independent from the type of storage hardware of either site. If running in a cluster with global networking, the server .on the local site can be configured to use other than a direct network connection.

Functionality

Functionality refers to the operation of a geographic replication system. The geographic replication system of the present invention captures all state changes (hereafter referred to as writes) to file systems and raw devices. Self-consistency is always maintained at the remote site even if the remote site is not current with the local site. In a preferred embodiment, geographic replication operations are invisible to applications. The replication system of the present invention can be configured to support at least two levels of data safety, including 1-safe and 2-safe modes, which are defined in the background. In 1-safe, or asynchronous, mode, the present invention logs operations at the local site and periodically replicates the data to the remote site. In 2-safe, or synchronous, mode, the present invention copies data to the remote site before an operation on the local site is allowed to complete. Regardless of the mode, at start-up the local and remote sites automatically synchronize their data so that any future, mutually-applied operations result in identical states. Additionally, the geographic replication system can be configured to be compatible with any replication services provided by database (for more information, see Oracle, "Oracle7 Distributed Database Technology and Symmetric Replication," available at: http://www.oracle.com/products/oracle7/serverlwhitepapers/replication/html/index.html., which is entirely incorporated herein by reference) or other applications running on the local or remote sites.

The replication system of the present invention can also be configured to support an additional level of data consistency called very safe mode. Very safe mode enhances 2-safe mode, adding a two-phase commit protocol to ensure consistency between the local and remote sites. Additionally, the replication system can be configured so that:

1) the synchronization (or resynchronization) of local and remote sites does not require the local site to be taken off-line;
2) read-only access to the remote site is available during normal operation;
3) the replication system automatically configures and starts itself at system boot; and
4) protection is provided against file deletion.

Failure Characteristics

Failure characteristics define the behavior of the geographic replication system in the event of a failure. In 1-safe mode, the local site continues operation after failure of or loss of connection to the remote site. After temporary loss of connection to, or failure of, the remote site, the local and remote sites resynchronize automatically. The present invention is configured so that manual switchover to the remote site is always possible after failure of the local site. That is, the remote site is always ready to perform reading and writing transactions after a local failure. In both 1-safe and 2-safe modes, the amount of data lost in a failure of the local site can be estimated in terms of the time since the previous log flush, the size of the unflushed data, or .the number of operations that have not been transmitted to the remote site. No data is lost in very safe mode.

Additionally, the present recovery system can be configured to provide a log of lost transactions to be used by the local site after it has been restored after a failure. Preferably, the remote site takes over automatically after failure of the local site. Also, in a preferred embodiment when the original local site is restored after failing over to the remote site, it can be automatically resynchronized and reinstalled as the local site.

Administration

Ease of administration is critical to the acceptance of the geographic replication system. As the flexibility and number of features increase, administration grows in importance. The geographic replication service of the present invention provides a user-level API to support management programs or applications that need to change replication characteristics. Default values are provided for parameters whenever possible. Alternatively, the present invention provides a wizard to assist in administration of the replication system.

Performance

The critical performance issue is the extent to which the present geographic replication system degrades the performance of local site operations (e.g., reads and writes). When the geographic replication system is in synchronous (2-safe) mode, writes are greatly slowed due to the need to delay writes until the relevant data is replicated on the remote sites. In 1-safe mode, the performance of writes on the local site is degraded by no more than ten percent. In all normal modes of operation, the performance of reads is degraded negligibly or not at all. System write operation for the very safe mode is even slower than in the 2-safe mode due to the 2-phase commit process associated with that mode.

Figure 2:
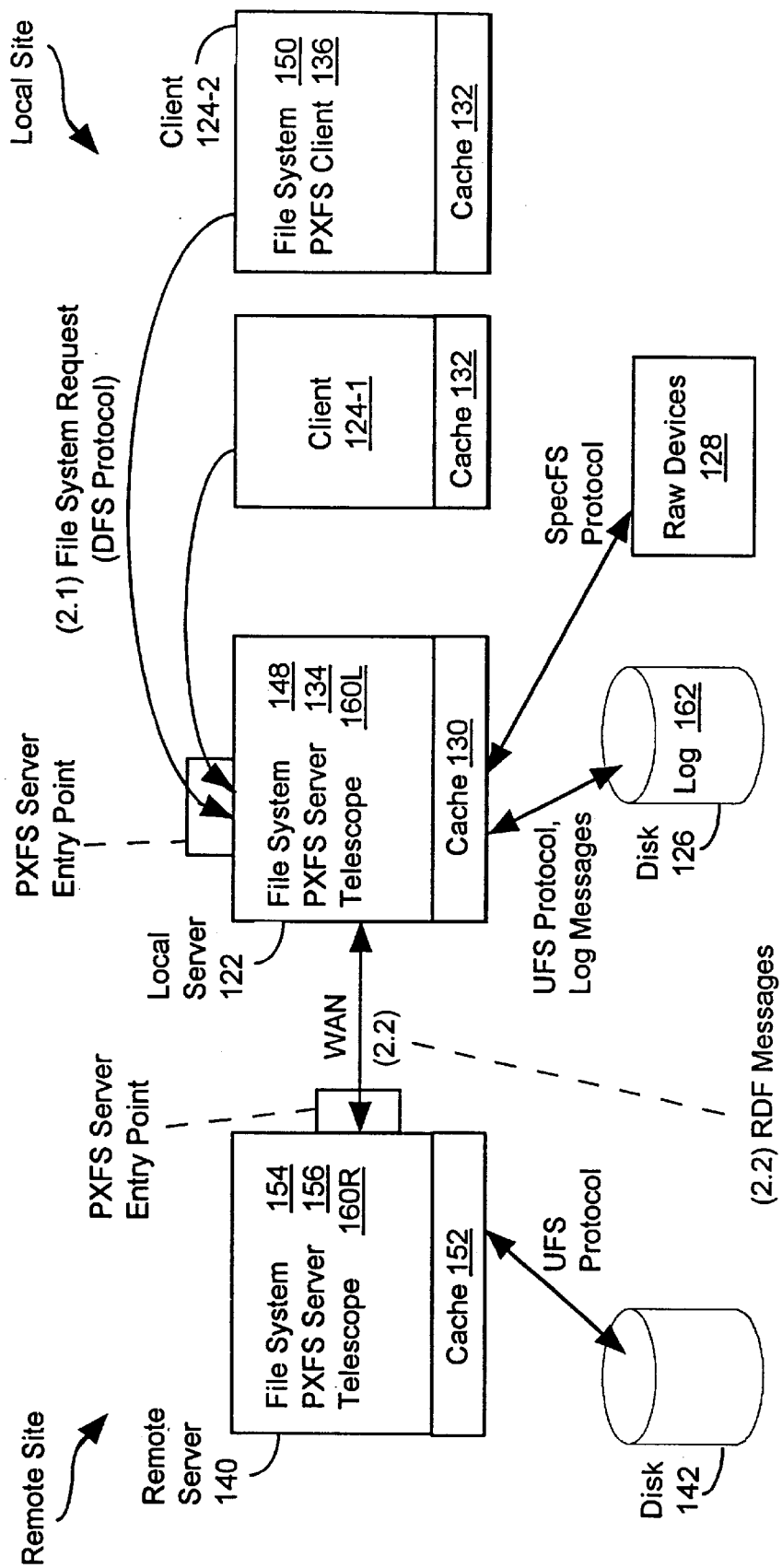
FIG. 2 is a block diagram of a preferred embodiment of a geographic replication system wherein the local and remote sites each employ a single file server.

Referring to FIG. 2, there is shown a block diagram of a preferred embodiment 120 of a geographic replication system that can be used to replicate file system data from a local site to a remote site. It is assumed that the operating system running on all sites is Sun Solaris; however, the teachings of the present invention are readily applicable to other network operating systems with only minor, obvious modification. The local site includes a file server 122, clients 124, stable file storage 126, and raw devices 128. The file server includes a fast cache memory 130 and is loaded with file system software 148 that resolves user file system requests (2.1) against data in the cache 130, the stable file storage 126 or the raw devices 128 in the conventional manner. Each of the clients 124 also includes a cache 132 and file system software 150 compatible with the server file system software 148.

The clients 124 issue the requests (2.1) using a distributed file system (DFS) protocol. In Sun Solaris, the DFS is the Proxy File System (PXFS), which is also called Galileo. Accordingly, the server file system 148 includes PXFS server software 134, the client file system 150 includes PXFS client software 136, and the file system requests (2.1) are issued to a PXFS server entry point. The file storage 126 can be one or any combination of a single hard disk, a cluster of hard disks, a dual-ported hard disk, a tape drive or any other type of non-volatile memory device. In a preferred embodiment, the file system 148 accesses the file storage 126 using the Unix File System (UFS) protocol and the raw devices 128 using the Special File System (SpecFS) protocol. Both UFS and SpecFS are part of the Sun Solaris operating system.

The remote site includes a file server 140, stable file storage 142 and optional raw devices (not shown). The file server 140 includes a fast cache memory 152 and is loaded with file system software 154 that resolves file requests against file data in the cache 152, the stable file storage 142 or the raw devices. The file system software 154 also includes PXFS server software 156. The file storage 142, raw devices and cache memory 152 are not necessarily similar to the analogous elements 126, 128 and 130. of the local site. For example, the file storage 126 and 142 can be completely different as long as the remote file storage 142 can accommodate all of the replicated data from the local file storage 126. The remote server 140 is preferably coupled to the local server 122 over a wide area network (WAN) connection, but any type of connection will suffice. As the local server 122 handles-file system requests (2.1) it issues remote data facility (RDF) messages (2.2) to the remote server 140. The purpose of the RDF messages (2.2) is to transfer enough information to the remote server 140 to enable the server 140 to handle file requests (2.1) from the clients 124 whenever failover occurs from the local server 122 to the remote server 140.

The RDF process is managed by geographical replication software, called "Telescope" 160, which runs in both the remote and local servers as an extension of PXFS/Galileo. Among other things, the Telescope software 1 60L on the local server 122 determines what file system data is transferred in the RDF messages (2.2). The Telescope software 160R on the remote server 140 works with its file system 154 to store the RDF data from the local server 122 on the file storage 136 or raw devices and, when failover occurs, determines how to establish a consistent file system state given the transferred RDF data. Once it has established a consistent file system state, the remote server 140 is able to handle file system requests (2.1) transferred from the local site following a failover.

In a preferred embodiment, Telescope 160 is an enhancement of the PXFS cluster file system (for more information on PXFS, refer to Vlada Matena, Yousef A. Khalidi, Ken Shirriff, "Solaris MC File System Framework," Sun Microsystems Laboratories Technical Report SMLI TR-96-57, October 1996, which is entirely incorporated herein by reference). Telescope 160 resides on the server side of PXFS (e.g., on the local server 122), where it captures state changes to the PXFS file system. State changes to the file system 148 at the local site are encoded at the local site by Telescope 160L as operations and their parameters. Telescope 160L transmits the encoded operations to the remote site using generic Unix networking utilities. At the remote site, the Telescope receiver 160R decodes the operations and applies the decoded operations to a copy 154 of the file system 148 running on the remote server 140. By applying the same operations at the remote site that were applied at the local site, Telescope 160 keeps the two sites in the same states.

Telescope 160 incorporates some of the advantages of other geographic replication strategies. Like Uniq UPFS, Telescope 160 is implemented in a file system (e.g., the file systems 148, 154) rather than in a device driver or storage unit. The file system approach allows Telescope 160 flexibility and efficiency in dealing with high-level file and directory operations. Like Qualix DataStar, Telescope 160 incorporates a stable log 162 (FIG. 2) to store operations that have not yet been transmitted to the remote site. In a preferred embodiment, the log 162 is stored on the local disk 126. This increases data safety by making lost transactions recoverable after a system crash. Finally, like EMC SRDF, Telescope provides variable modes of consistency between the local and remote sites.

Telescope 160 has 1-safe, 2-safe, and very safe transmission modes. Very safe mode suffers from poor latency, but it guarantees that transactions are consistent between sites. 2-safe mode improves latency over very safe mode, but it sacrifices consistency guarantees. It keeps the local and remote sites in lockstep, reducing the data that could be lost in a failure. 1-safe mode optimizes performance at the local site, but does not guarantee constant consistency between the local and remote sites.

In a preferred embodiment, failover is a manual operation. A system administrator must decide that the local site is down and then start the PXFS service (i.e., the PXFS server 156) on the remote site. However, the teachings of the present invention are equally applicable to systems having long-distance cluster heartbeat monitors and improved administration tools to automate these failover tasks. Before providing additional details about Telescope 160, the data structures and programs associated with the local and remote sites are now described in reference to FIG. 3.

Figure 3:
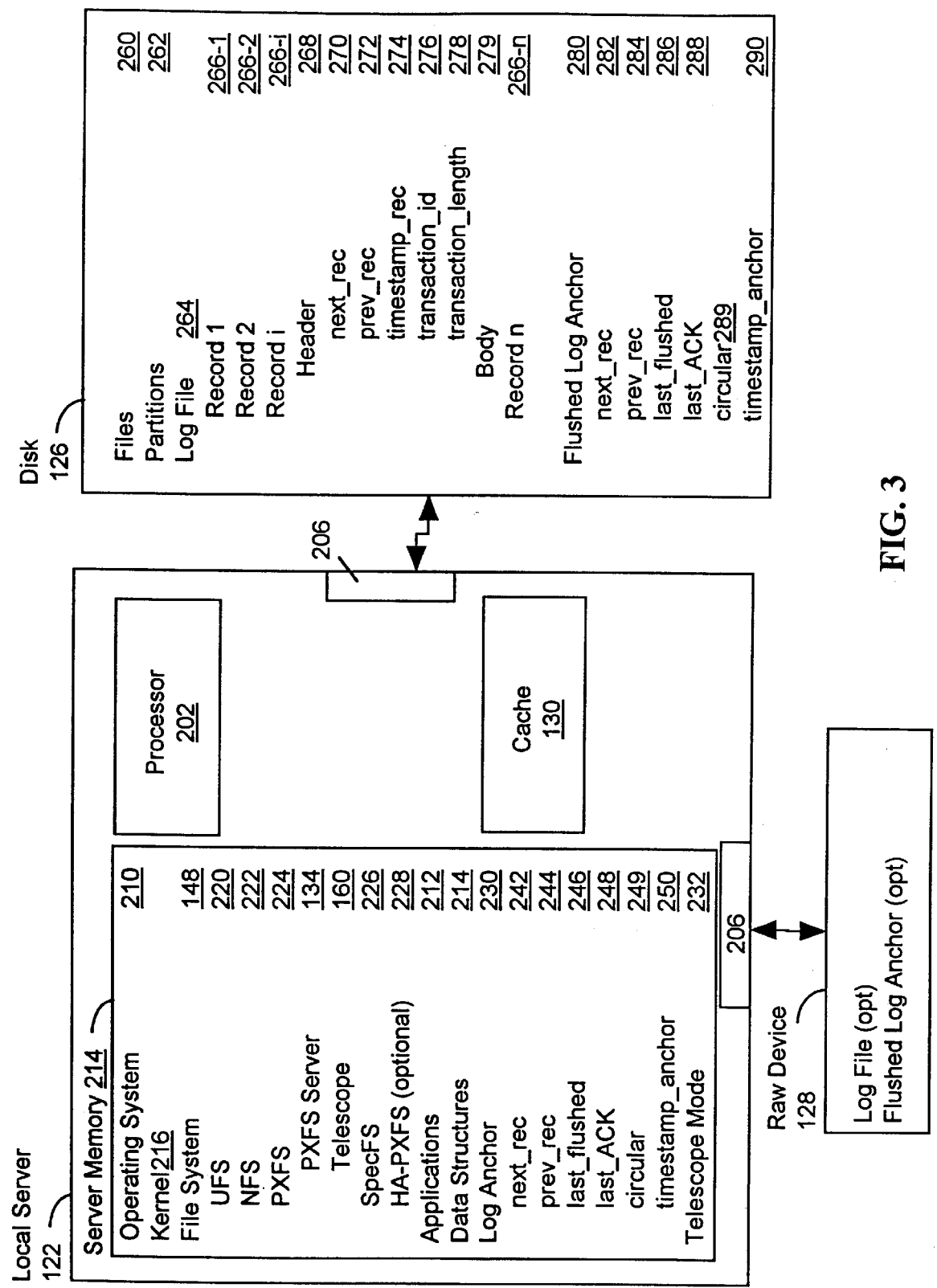
FIG. 3 is a block diagram of data structures associated with the embodiment of FIG. 2.

Referring to FIG. 3, there is shown a block diagram with elements common to both of the servers 122, 140, raw devices 128, 158 and file storage devices 126, 156. The present description is directed to the local site versions of these elements and is generalizable to the remote server 140. The descriptions of these elements are also generally applicable to the clients 126 with obvious exceptions (e.g., a client 126 includes client versions of file system components instead of server versions). The server 122 includes a central processing unit (CPU) 202, a high speed memory 204, a cache memory 130 and a plurality of device interfaces 206 (e.g., busses or other electronic interfaces) that enable the CPU 202 to control and exchange data with the memory 204, raw devices 128 and file storage 126.

The raw devices 128 can include, but are not limited to, high availability devices, printers, kernel memory, communications devices and storage devices (e.g., disk drives). Printers and storage devices are well-known. High availability devices include devices such as storage units or printers that have associated secondary devices. Such devices are highly available as the secondary devices can fill in for their respective primary device upon the primary's failure. Kernel memory is a programmed region of the memory that includes accumulating and reporting system performance statistics. Communications devices include modems, ISDN interface cards, network interface cards and other types of communication devices. The raw devices 128 can also include pseudo devices, which are software devices not associated with an actual physical device.

The memory 204 of the server 122 can store an operating system 210, application programs 212 and data structures 214. The operating system 210 executes in the CPU 202 as long as the computer 122 is operational and provides system services for the applications 212 being executed in the CPU 202. The operating system 210, which is modeled on v. 2.6. of the Solaris® operating system employed on Sun®) workstations, includes a kernel 216, and the file system 148. (Solaris and Sun are trademarks and registered trademarks, respectively, of Sun Microsystems, Inc). The kernel 216 handles system calls from the applications 212, such as requests to access the memory 204, the file system 148 or the devices 128. The file system 148 includes whichever file system components are required by the server 122, including the UFS 220, a Solaris network file system (NFS) 222, the PXFS 224, including the PXFS server 134 and the Telescope software 160, the SpecFS 226 and an optional, high availability cluster file system (HA-PXFS) 228.

The data structures 214 include a log anchor 230, which documents the file operations logged by the local Telescope program 160L, the log records that were transferred to the remote Telescope program 160R and the transfers that were acknowledged by the remote site. The log anchor 230 is preferably stored in the memory 204 for faster access, but can also be stored on the disk 126 or raw devices 128. The log anchor 230 includes the following fields: next_rec 242, prev_rec 244, last_flushed 246, last_ACK 248, circular 249 and timestamp_anchor 250. These fields are described below in the context of the flushed log anchor 280, which is a version of the log anchor 230 stored on the disk 136. The data structures also include a system mode 232, which indicates whether Telescope 160 is operating in 1-safe, 2-safe or very_safe mode.

The disk 126 is a collection of data organized in files 260 and/or partitions 262. A key element of the present invention is the log file 264, which is preferably stored on the disk, but could optionally be stored on one of the raw devices 128. The log file 264 includes a number of records 266, each including enough information about a file system request (2.1) committed to the disk 126 to allow the request (2.1) to be satisfied by the remote server 140 (assuming the data is transferred via an RDF message (2.2)). Each record 266 include's a header 268 and a body 279. The header is used to decode the log data and includes information that indicates:

the relationship of one record 266i ("i" is an integer index) to adjacent records 266i+1, 266i−1 (next_rec 270), prev_rec 272);

when the record was written (timestamp 74); a unique transaction identifier (transaction_id 276); and the length of the transaction (transaction_length 278).

The body 279 contains the logged file information described by the header 268.

The disk 136 also includes a flushed log_anchor data structure 280, which holds information used to decode the log file 264 and reconstruct the log (e.g., on the remote site). The flushed log_anchor data structure 280 is formatted identically to the log_anchor 230 and includes the following fields: next_rec 282, prev_rec 284, last_flushed 286, last_ACK 288 and timestamp_anchor 290. The structure 280 is called the flushed log_anchor because it is written to stable storage 126 only after Telescope 160 has flushed the log 264 to the remote Telescope instance 160R. Before describing the operation of the present invention further, the file system 148 and its relationship to the disk 136 and raw devices 128 are now described in reference to FIG. 4.

Figure 4:
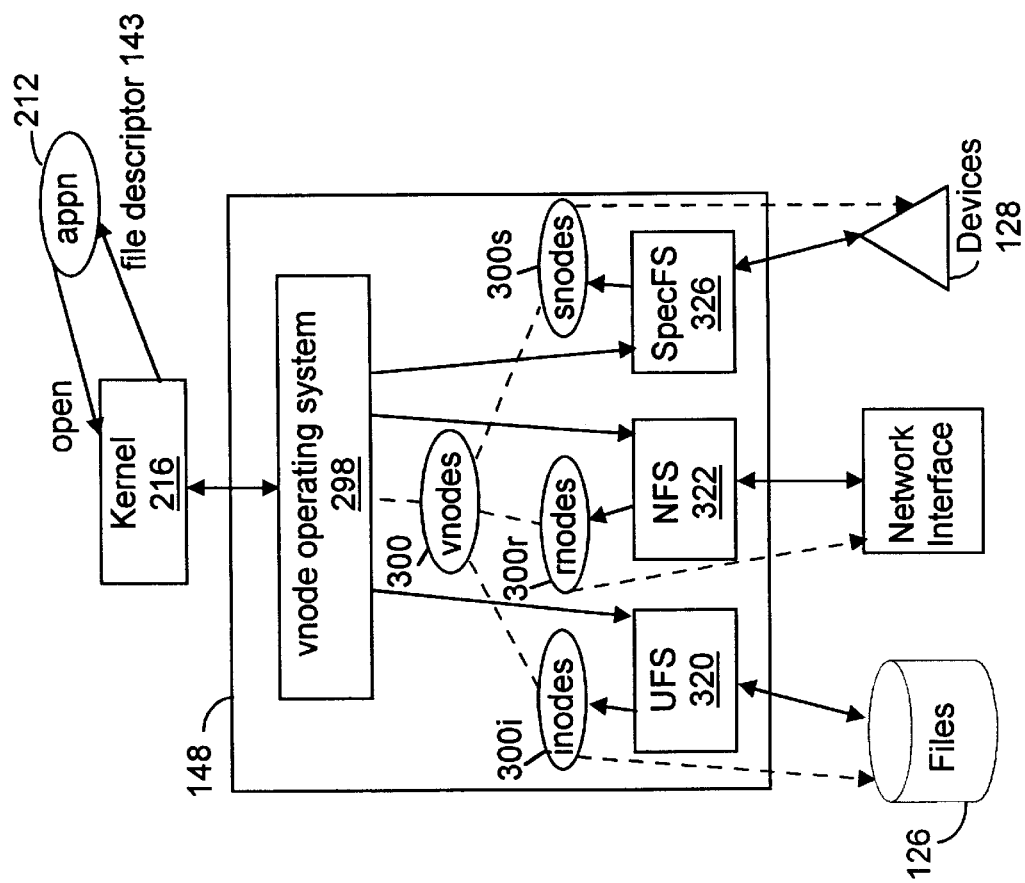
FIG. 4 is a diagram illustrating functional relationships between the operating system, file system components and applications that are common to both the prior art and the present invention.

Referring to FIG. 4, there is shown a high-level representation of the file system 148 employed by v. 2.6 and previous versions of the Solaris operating system and the present invention. In Solaris, the file system 148 is the medium by which all files, devices and network interfaces are accessed. These three different types of accesses are provided respectively by three components of the file system 148: the UFS 320, the SpecFS 326 and the NFS 322. Each of the constituent file systems is controlled by a top level vnode operating system 298.

In Solaris, an application 212 initially accesses a file, device or network interface (all referred to herein as a target) by issuing an open request for the target to the file system 148 via the kernel 216. The file system 148 then relays the request to the UFS 320, SpecFS 326 or NFS 322, as appropriate. If the target is successfully opened, the UFS, SpecFS or NFS returns to the file system 148 a vnode object 300 that is mapped to the requested file, device or network node. The file system 148 then maps the vnode object 300 to a file descriptor 301, which is returned to the application 212 via the kernel 216. The requesting application 212 subsequently uses the file descriptor 301 to access the corresponding file, device or network node associated with the returned vnode object 300.

The vnode objects 300 provide a generic set of file system services in accordance with the vnodeNFS operating system (VFS) 298 that serves as the interface between the kernel 216 and the file system 148. Solaris also provides inode, snode and rnode objects 300i, 300s, 300r that inherit from the vnode objects 300 and also include methods and data structures customized for the types of targets associated with the UFS, SpecFS and NFS, respectively. These classes 300i, 300s and 300r form the low level interfaces between the vnodes 300 and their respective targets. Thus, when the UFS, SpecFS or NFS returns a vnode object, that object is associated with a corresponding inode, snode or rnode that performs the actual target operations. Similar principles are involved when an application running on one node (e.g., the client 124-1) requests a file operation on a file residing on another node (e.g., the client 124-2), where both nodes are within a cluster under the control of a single PXFS 324. How the PXFS 324 handles such a request is well-known, but is described briefly herein in reference to FIG. 5.

Figure 5:
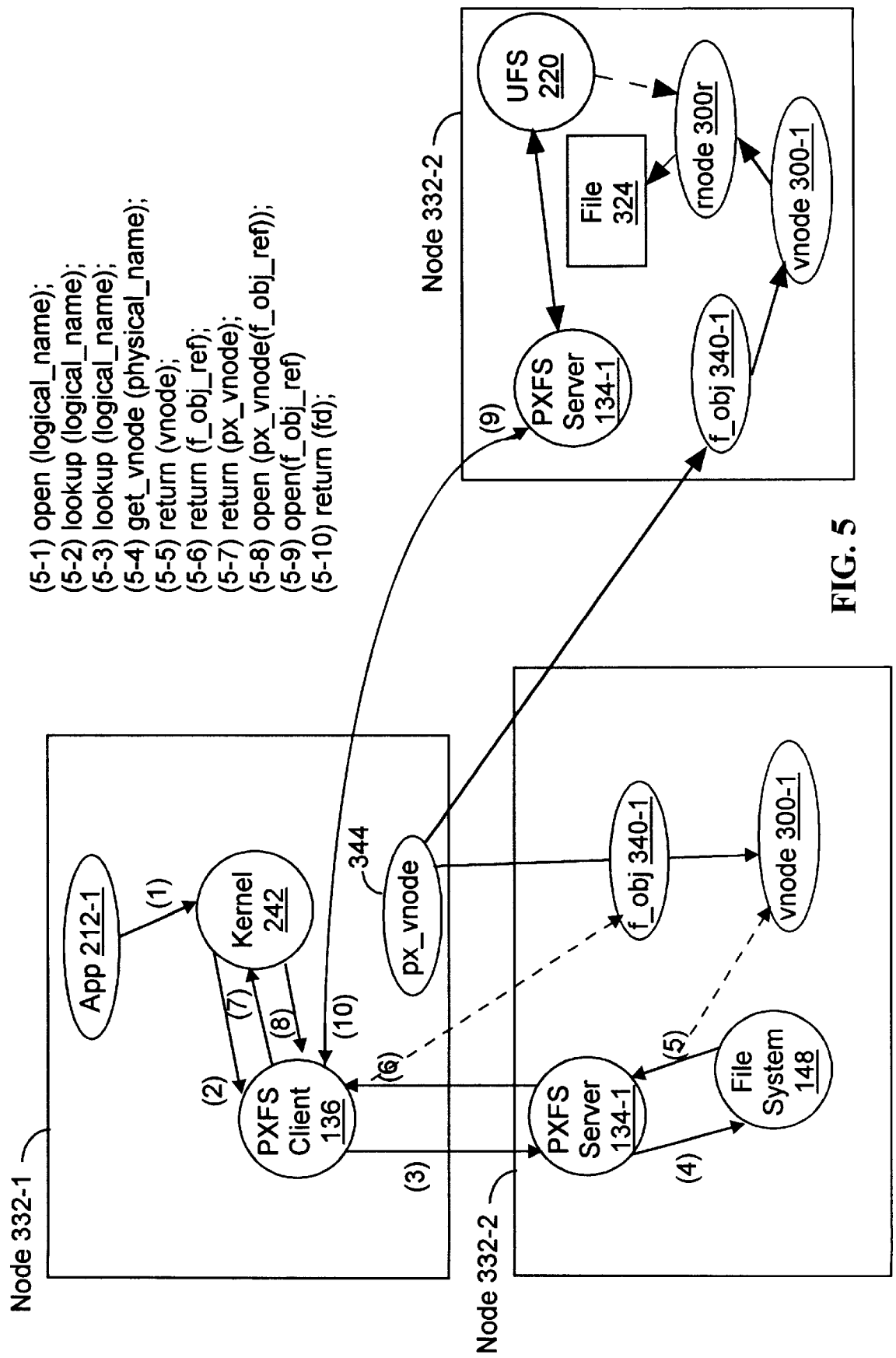
FIG. 5 is a functional flow diagram illustrating transparent file access operations across multiple nodes of a cluster employing a distributed file system, such as PXFS.

Referring to FIG. 5, there is shown a flow diagram of the steps performed by a computer system similar to that in which the present invention is implemented in response to a request (5-1) from an application 212 executing on a node 332-1 to open a file 324 that resides on a different node 332-2. In this example, the file system 148 resides on the node 3:32-2. Note that FIG. 5 shows two copies of the node 332-2 to clarify the messages and operations employed. The application 212 issues the open request to the local kernel 242 on the device's logical name. The kernel 242 then queries the file system 148 to procure a handle for the requested file 324. Because the file system 148 is on a different node from the kernel 242, this is a multi-step process that involves the use of the PXFS 224.

An object such as the kernel 242 (on the node 332-1) that needs to access the file system 148 first issues the access request to its local PXFS client 136. The PXFS client 136 holds a reference to the PXFS server 134 co-located with the file system 148. This reference enables the PXFS client 136 to communicate the kernel's request to the file system 148 via the PXFS server 134. The file system 148 performs the requested access, creates a vnode object 300-1 representing the requested file and returns a reference to the vnode object 300-1 to the PXFS server 134. Because the nodes 332-1 and 332-2 are different address spaces, the reference to the vnode 300-1 is useless to the PXFS client 136 and kernel 242 in the node 332-1. Consequently, the PXFS server 134 creates a file implementation (f_obj) 340 linked to the vnode 252 and returns a reference 342 to the f_obj 340 to the PXFS client 136. Upon receiving the f_obj reference 342 the PXFS client 136 creates a proxy vnode (px_vnode) 344 that is linked to the f_obj 340 via a f_obj_ref (not shown), which is a client side representation of the f_obj. The kernel 242 can then access the file information represented by the vnode 300-1 by simply accessing the local px_vnode 344.

Using this mechanism, the kernel :242 issues a lookup message (5-2) on the logical name of the device to be opened to the PXFS client 136, which relays a similar lookup message (5-3) to the PXFS server 134. The PXFS server 134 issues the file system 148 a get_vnode message (5-4), which asks the file system 148 to map the logical_name to the corresponding physical_name and return a reference to a v_node 300-1 representing the UFS file identified by that physical_name. As described above, the file system 148 then returns the vnode to the PXFS server 134 (5-5) and the PXFS server 134 creates a corresponding f_obj 340 and returns the f_obj reference 342 to the PXFS client 136 (5-6). The PXFS client 136 then creates a px_vnode 344 and passes the px_vnode reference 346 to the kernel 242 (5-7). At this point, the kernel 242 issues an open message (5-8) to the PXFS client 136 for the px_vnode 344. Upon receiving this message, the PXFS client 136 determines from the px_vnode's attributes how to satisfy the open request and opens the file. This is possible because the px_vnode 344 references the f_obj 340-2 on the node 320-3 that is associated with the requested file 324 via a vnode 300 and an inode 300i, as described in reference to FIG. 4. In particular, the kernel 242 issues an open(f_obj_ref) request (5-9) to the PXFS server 134-3, where f_obj_ref is an object reference to the f_obj associated with the file 242. After additional steps (not shown) involving both the local copy of UFS 220-3 and the PXFS server 134-3, the PXFS server 134-3 returns (5–10) the file descriptor of the file 242 if the open was successful. A similar process is performed for all file operations, such as writes, deletes and appends, which, in contrast to an open operation, affect the state of the file system.

Having described some of the basic aspects of the PXFS file system, the Telescope geographical replication system 160, which in a preferred embodiment is implemented as an extension to PXFS, (FS, is now described in detail.

Referring again to FIG. 2, the Telescope service 160 is spread through many components of the cluster. For instance, the Telescope service 160 intercepts file system updates, records a log, consumes network resources and exports management interfaces, all at different locations. This section focuses on two particular location issues: where file system updates are intercepted and where Telescope implementation objects are located.

In a preferred embodiment, file system updates and requests (2.1) are intercepted in the PXFS server 134. This approach has several advantages:

1) State changes are captured as fairly high-level operations. That is, Telescope 160 records changes to files and directories rather than disk sectors and volumes. Dealing with high-level operations increases flexibility over low-level approaches. For instance, the remote site is not restricted to the same disk geometry as the primary site. Replication can be toggled on a per-directory or per-file basis. Also, the data transmission format can be optimized. Rather than sending entire blocks of data, operations can be encoded to stretch network bandwidth.

2) The PXFS server 134 is below the cache 160. Referring to FIG. 2, caching in PXFS is implemented on the client side 124, with the local server 122 as a data provider. When updates reach the point where the PXFS server 134 delivers them to the underlying file system 148, they are bound for stable storage 126. Trapping updates in the PXFS server 134 allows Telescope 160 to ensure that no cache effects will prevent consistency between the local and remote sites.

3) The PXFS server 134 is instrumented with mechanisms (called HA-PXFS) for high availability. In high availability mode, operations are checkpointed from a primary server machine to a secondary server machine. In an alternative embodiment described in reference to FIG. 10, Telescope 160 is integrated with this high availability checkpointing scheme, which allows geographic replication to persist even if a server 122 is incapacitated.

4) Implementing Telescope 160 in the PXFS server 134 allows for a software-only approach. No special storage devices are required and generic networking utilities can be used for the transmission of data between sites.

Given that the Telescope service 160 is incorporated in the PXFS server 134, there are still several different ways in which the Telescope 160 can be configured to implement the geographic replication service. Specifically, there are several different ways in which the Telescope service 160 maps to clusters, nodes, file systems, directories, and files. A few of these alternative arrangements are now described. Note that a cluster system is not specifically illustrated in FIG. 2. However, it should be assumed that the local server 122 represents one or many cluster nodes and the PXFS server software 134 represents one or more PXFS server instances that can run on the respective cluster nodes.

1) One Telescope service per cluster: In this case, the various PXFS server instances 134 across a cluster replicate through a central Telescope instance 160. This approach simplifies administration, but has disadvantages for high availability (single point of failure) and efficiency (all replicated data may have to be moved multiple times through the ORB). Note: an ORB, or Object Resource Broker, is a distributed mechanism for handling remote procedure calls generated by users (e.g., of a client) who request execution of methods associated with objects on a different computer (e.g., a server).

2) One Telescope service per node: In this case, the various PXFS server instances 134 on a node replicate through a single Telescope instance 160. This approach is still fairly simple for administration, and it avoids the possibility of excessive inter-machine data transfer through the ORB.

3) One Telescope service per PXFS server instance: In this case, there can be multiple Telescope instances 160 on each node. Each Telescope instance 160 is associated with a PXFS server file system object 134, which is tied to an underlying file system (e.g., the UFS 148). This approach makes administration difficult because the replication instances are potentially numerous and spread out. Moreover, in a transparently global file system, such as PXFS 224 (FIG. 3), the actual location of files should be invisible to applications. However, this configuration ties in well with HA-PXFS, allowing replication and log operations to be checkpointed to a secondary server.

4) One Telescope service per PXFS file system: As the global file system becomes more pervasive in Galileo clusters, providing one Telescope service 160 per PXFS file system 224 is equivalent to providing one Telescope service 160 per cluster. This is the configuration that is specifically illustrated in FIG. 2. This configuration is preferred for administrative reasons because, by associating Telescope 160 with a file system 148, all Telescope instances 160 can be located by iterating through file systems. This configuration is also preferred for management reasons, as it typically employs only a single PXFS file system 224. This configuration also provides technical advantages. For instance, operations on the file system 148 can be serialized by the order in which they are conveyed to the Telescope service 160.

As mentioned above, a preferred embodiment offers three different system modes 232: 1-safe, 2-safe and very_safe. Each pair of servers in an geographical replication relationship (e.g., the servers 122, 140) can be configured to have a different degree of coherency depending on the system mode 232 selected for that pair. (for more information on coherency modes, see Gray and Reuter). The different modes 232 are now described.

1-safe mode optimizes performance at the local site. Referring again to FIGS. 2 and 3, in this mode, operations intercepted by the Telescope service 160 are applied to the local file system 148 and logged in stable storage 126 (or 128). The I/O call (i.e., the file operation) on the local site is then declared complete, allowing the throughput and latency to be quite close to that of an un-replicated file system. Periodically, the logged operations are batched and transmitted to the remote site, where they are applied to the remote copy of the file system 152. Although the remote site may lag behind the local site, the log 264 on the local site is designed to always hold the difference between the two. Thus, if the local site crashes and the not-yet-transmitted transactions are lost, they can be recovered as soon as the local site log 162 is made available. For 1-safe mode to be effective operations must be recorded in the log pursuant to the requirements specified above, in the summary. The log 264 is described in greater detail below.

2-safe mode improves the consistency between the local and remote sites but sacrifices performance. Operations intercepted by Telescope 160 are first applied to the local file system 148 and then immediately transmitted to the remote site. The I/O operation on the local site cannot return successfully until an acknowledgment is received from the remote site. With respect to the applications 212, I/O operations execute synchronously on the local and remote sites; however, the latency incurred in transmitting the data to the remote site significantly degrades performance.

2-safe mode uses the same method of encoding operations as 1-safe mode. Encoded operations are recorded in a stable log 264, just as in 1-safe mode. Thus, if the local site should crash before the synchronous transmission can occur, the one lost transaction can be recovered. Once an acknowledgment from the remote site is received, the logged operation can be discarded.

Note that even though the Telescope service 160 performs operations synchronously in 2-safe mode, it is possible for the local and remote sites to have different state. For example, if the local site fails after applying the operation locally but before transmitting the RDF message (2.2), the remote site will not receive the operation. Even though the transaction is stored in a log at the local site, the file systems are not synchronized. Very safe mode avoids this problem using a two-phase commit protocol.

According to the two-phase commit protocol an operation intercepted by Telescope 160 is not immediately applied to the local site. Instead, it is logged, just as in 1-safe mode, and transmitted to the remote site. The remote site decodes the operation, logs it, and sends back a "ready to commit" message. Upon receiving the "ready to commit" message, the local site responds with a "commit" message and proceeds to apply the operation to, its local file system 148.

The two-phase commit protocol guarantees that the two file systems 148, 154 remain synchronous. Since the extra messages increase the latency over 2-safe mode, it is not likely that very safe mode will be practical for most applications. In fact, Gray and Reuter remark that only a few systems offer very safe mode, and they know of no customers who use it (for more information, see Gray and Reuter).

Naming is an important issue in any project related to file systems. The Telescope service 160 naming scheme meets the following constraints:
1) One identifier can refer to a file at the local site and the remote site.
2) The identifier is small, consuming minimal log space and network bandwidth.
3) A file's identifier translates efficiently to and from its pathname and PXFS file object.
4) A file's identifier should persist through reboot.

A preferred naming scheme that satisfies all of the above constraints is now described. However, this description should not be interpreted to limit the scope of the present invention, which encompasses all possible naming systems used in similar contexts.

A number of techniques already exist for identifying files. Unix file descriptors satisfy the second and third constraints, but are process and machine dependent. File pathnames satisfy the first constraint in replicated file systems, but long character strings consume space, and the pathname is not always accessible (while utilities exist to-map pathnames to vnodes, mapping from a vnode to a pathname is far from trivial).

A preferred Telescope naming scheme uses the fobjid_t type, which is derived from the underlying vnode fid_t type. An fobjid_t is a unique and persistent identifier for a file. Files can be mapped to fobji_ts and fobjid_ts can be mapped back to files. Since fobjid_ts are derived from a file's inode on disk, the fobjid_t will remain the same even after a reboot. The fobjid_t and fid_t types serve the same purpose as the like-named elements of FIG. 5.

However, fojid_ts are only unique on a single machine; therefore, the present invention maintains a mapping table that maps local fojid_ts to remote fojid_ts. (Note: the mapping table can actually map local fojid_ts to remote pathnames, remote fojid_ts, pointers to fobjs on the remote site, or even pointers to underlying vnodes on the remote sit—whichever is most efficient). In a preferred embodiment, the mapping table is stored on the remote site, meaning that entries in the log 264 identify files by their fojid_ts on the .local site. The rationale for maintaining the mapping table on the remote site is twofold:
1) It decreases I/O latency on the primary site by removing the fobjild_t translation from the critical path.
2) It allows for greater asynchrony. That is, if entries in the log 264 referred to files by remote site fojid_ts, then for each new file accessed on the primary site, a synchronous call to the remote site would be required to determine the appropriate fojid_t to identify the file.

Figure 6:
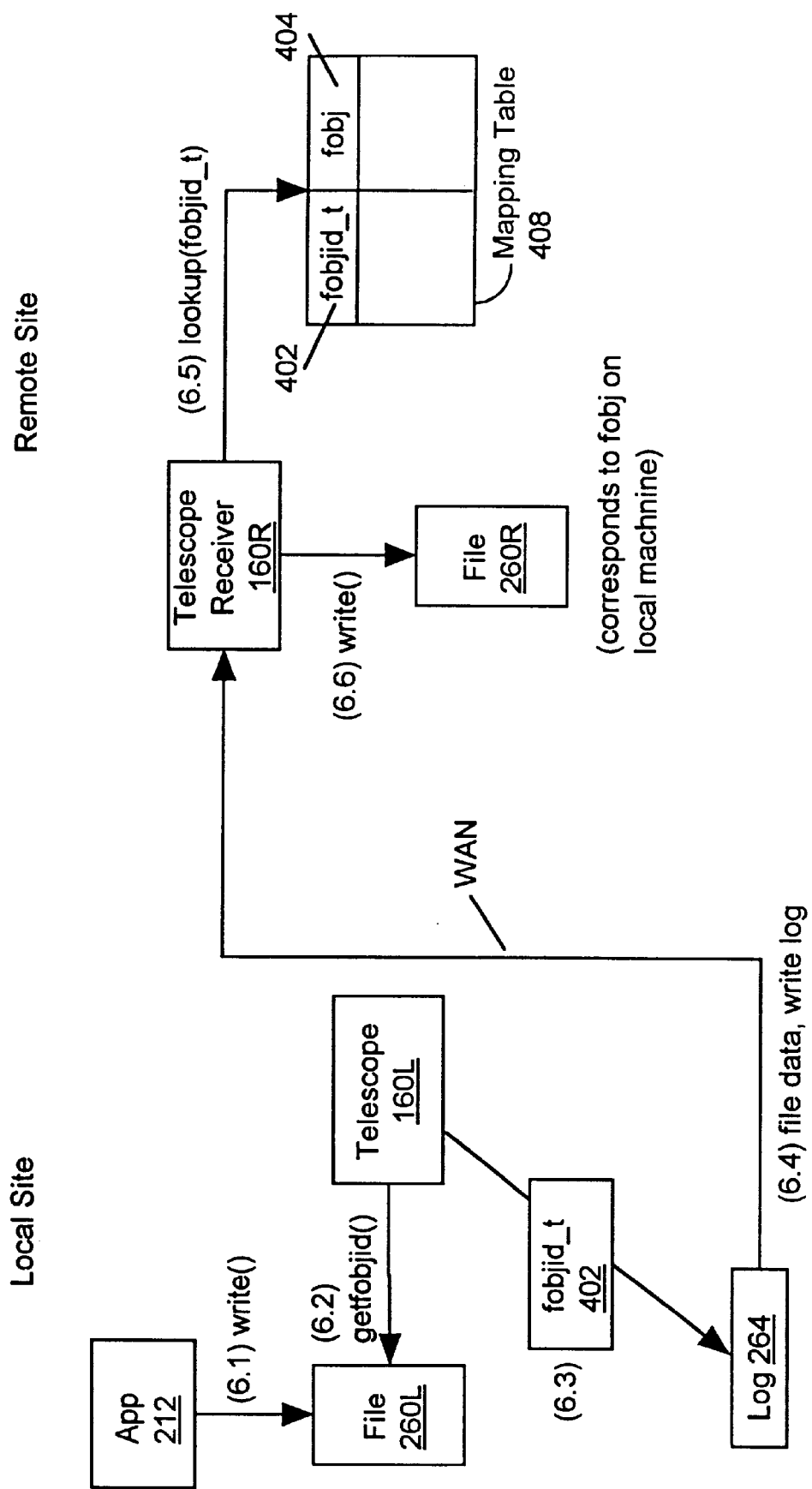
FIG. 6 is flow diagram illustrating a first method employed by the present invention to transfer log information from a local site to a remote site.
Figure 7:
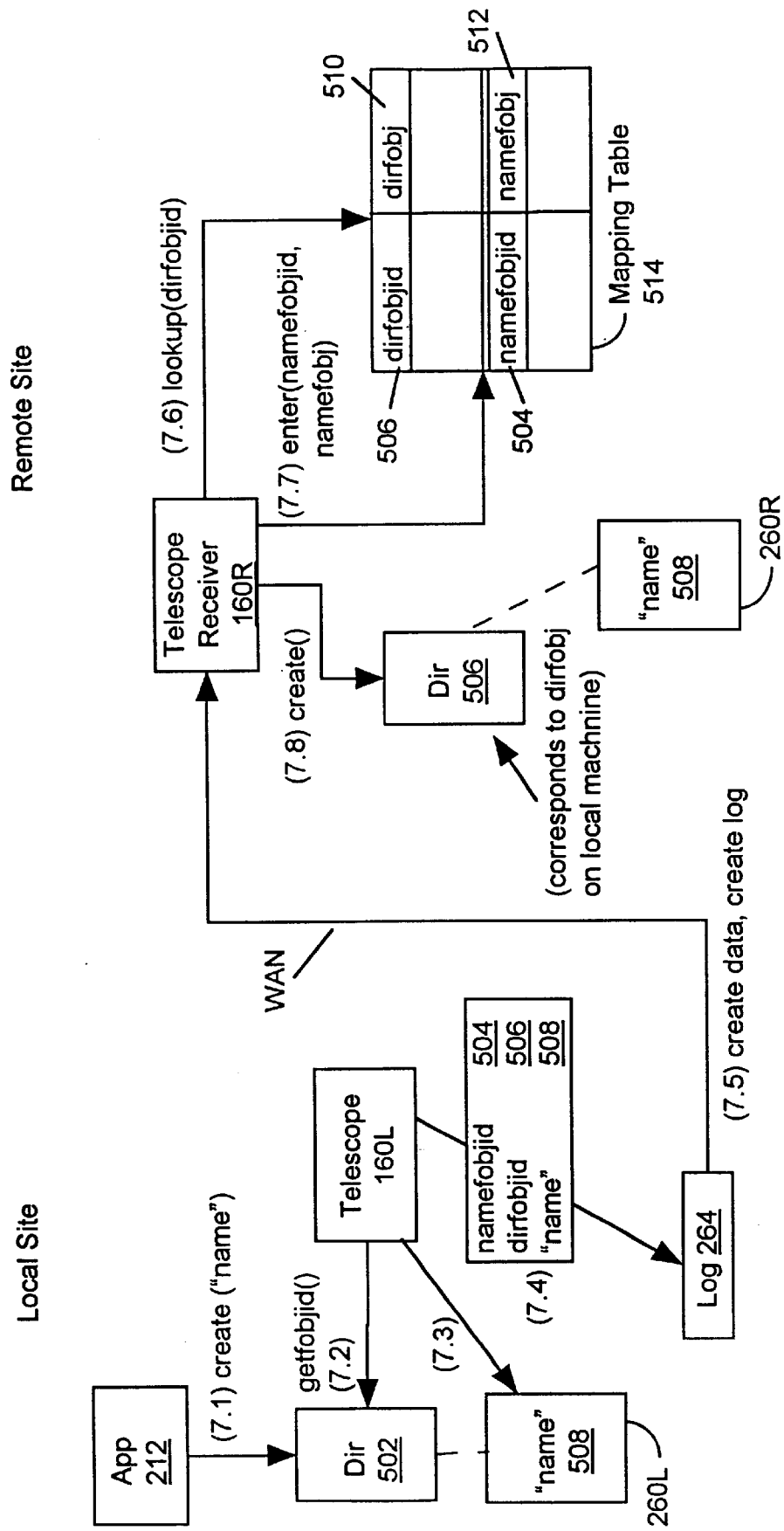
FIG. 7 is flow diagram illustrating a second method employed by the present invention to transfer log information from a local site to a remote site.

Two different mapping schemes from files to fobjid_ts are now described in reference to FIGS. 6 and 7. Each of these figures shows how mapping is implemented for a write operation, which typifies operations that modify the file system state and therefore are checkpointed and replicated by the Telescope service 160. Both embodiments include a local site with applications 212, Telescope service 160L, files 260L. identified by fojid_ts 402 of one or more type, and a log file 264. Both embodiments also include a remote site with a Telescope receiver 160R, files 260R identified by remote and local site identifiers 404, 402 (e.g., fojid_t and f_obj, respectively) and a mapping table 408 that defines the mapping between the remote and local site identifiers 404, 402.

Referring to FIG. 6, there is illustrated the steps of a file write and geographical data replication process for a first preferred mapping system. The replication process (i.e., Telescope 160L) is triggered when a file 260L is written (6.1) to the local site file storage 126. Telescope 160L then obtains the fojid_t 402 of the file using the getfobjid command (6.2) and checkpoints information about the write operation (e.g. the fojid_t) to the log 264 (6.3). Telescope 160L then replicates file state information (e.g., the file 260L contents and logged write information, such as the fojid_t) to the remote site in accordance with the selected Telescope mode 232 (6.4).

At the remote site, the Telescope receiver 16OR writes the replicated file data to the remote site file storage 142 as a remote file 260R (6.6) and translates the fojid_t 402 to a remote site file object 404 (e.g., f_obj) using the mapping table 408 (6.5). The translation demonstrated in FIG. 6 can only be performed if the mapping table 408 is properly maintained. In particular, there are two preferred approaches to constructing and maintaining the name mapping table 408:

1) Each time a file 260L is accessed on the local site for the first time, Telescope enters a pathname-to-fobjid_t map entry 402 into the log 264. When the remote site Telescope 160R receives the map entry, it enters it into its primary fobjid_t-to-remote file mapping table 408.

2) As part of Telescope 160 initialization, a pathname-to-fobjid_t map entry 402 is entered into the log 2(34 for every existing file and directory to be replicated. Afterwards, map entries are only logged when a new file 260L is created or its name is changed. In these cases, it is sufficient for Telescope 260L to log the file name, directory fojid_t, and file fojid_t.

Referring to FIG. 7, the second mapping scheme, in addition to the elements shared with the embodiment of FIG. 6, employs local and replicated directories 410, 412 on the local and remote sites. In another difference from FIG 6, the information logged for a file 260L includes its "name", a namefobjid 402*n* and a dirfobjid 402*d*. The namefobjid and dirfobjid elements 402*n*, 402*d* are unique and persistent identifiers for the file "name" and the directory in which the file resides.

This scheme requires more work at initialization time, but it addresses a number of problems with the first scheme. For example, keeping track of the first time a file is accessed, as in the first scheme, can be difficult, especially if a remote site is added to the topology during operation. Also, accessing the complete filename from the PXFS server 134 is not easy from file operations that do not manipulate the name of the file (e.g., the read and write system calls). The only disadvantage of the second approach is the price paid at initialization and initialization will be complex and time-consuming, whether or not naming is involved.

In the embodiment of FIG. 7, when a file is created at the primary site, its corresponding fobjid_t 402*n* (shown as namefobjid in FIG. 7) is logged along with its "name" and its parent directory fobjid_t 402*d* (shown as dirfobj in FIG. 7). At the remote site, the directory fobjid_t 402*d* is mapped to the replicated directory 412 through the mapping table. A copy 260R of the new file is created in this directory, and the returned reference 404*n* is entered into the mapping table along with the fobjid_t 402*n* from the local site. Given this scheme, any time file operations on the local site are not possible, file requests from the local clients are routed via the WAN to the remote Telescope receiver 160R. The requests identify files by their local site dirobjids and nameobjids, which the Telescope receiver 160R, using the mapping table, maps to the corresponding namefobjs and dirfobjs of the replicated directories 412 and files 260R, respectively.

Synchronization

In normal operation, changes to the primary file system are recorded and transmitted to the remote site. This method of transmitting changes is considerably more efficient than periodically transmitting the entire file system; however, it only works if the two sites start in identical states.

Synchronization is a process that brings the remote site file system into the same state as the primary site file system. Synchronization must be performed whenever the primary and remote file systems are not converging upon the same state.

Synchronization is required in the following scenarios:
1) When Telescope replication begins on a new file system, the remote replicate must be synchronized with the file system to be replicated.
2) After a primary and remote site lose contact for a period of time, the remote site must be resynchronized with the primary site.
3) If a failover occurs to a remote site and the primary site is later restored, the original primary must be synchronized with changes that have occurred at the post-failover primary.

Conceptually, the simplest method of synchronization involves completely copying the primary file system to the remote file system. In practice, though, the brute force method is not always necessary. For instance, in the replication process described in reference to FIG. 7, if Telescope 160 is functioning in 1-safe mode and the log 264 has sufficient capacity, all changes that must be applied to resynchronize the remote site are conveniently recorded. Re-synchronization is as simple as transmitting and applying the log 264, which is significantly less draining on CPU and network resources than a complete file system copy. Similarly, in the third scenario, if the post-failover primary site can log all changes applied while the original local is off-line, there is always a record of the difference between the two sites. This scenario is more complex than the latter, since one or more transactions may have been applied at the original local site and not transmitted to the post-failover (remote) site before failover. Log requirements dictate that these transactions be available in the local site log (if it can be recovered). In this case, an administrator may have to intervene and choose which transactions exist in the new synchronized state.

Unfortunately, there are cases where a complete copy is the only way to ensure synchronization. The first scenario described, where a file system is first replicated by Telescope 160, is one example. Copying an entire file system over a wide-area network can be a time-consuming process. In order to guarantee the consistency demanded by synchronization, no modifications should occur on the local site file system while it is being copied to the remote site. However, this conflicts with the goal of minimal downtime at the local site during a synchronization.

A number of techniques can be borrowed from other technologies to avoid taking the local site off-line during synchronization. For instance, on-line backup procedures also require a consistent copy of a file system 148 while minimizing downtime. Telescope 160 synchronization off a locally mirrored disk requires extra hardware; the storage system must use mirrored disks to start with. All pending writes to the mirrored disk must be flushed before the synchronization begins, and during synchronization, no writes to the mirror disk can occur. The second technique, file system snapshots, also requires additional hardware, but it can be as simple as extra space on the same disk. Before Telescope 160R synchronization begins, a snapshot of the file system 148 is created. The snapshot initially consists of an empty holding area. During synchronization, writes by other applications will be applied to the file system, but on the first access of each affected block, the block will be copied to the snapshot holding area. Hence, for each block to be copied, Telescope 160 will first look in the snapshot holding area. If the block is not present it has not been modified, and Telescope 160 can copy it from the local file system 148.

Of the two on-line backup strategies, the snapshot method is best suited to Telescope. It is a software approach with minimal overhead and low implementation complexity. The snapshot method is enhanced for use with Telescope 160. The difference between performing backups and synchronizing for Telescope is handling the writes that occur during the file system copy. In a backup process, these writes can be ignored. The backup is deemed to represent the file system before any of these writes occurred. With Telescope 160, however, the local and remote site must be completely synchronized when replication begins. Thus, the writes that occur during the large file system copy must also be conveyed to the remote site. The best method of performing these writes is to add a log step to the snapshot method. When a block is written during the synchronization period, the original block is copied to the holding area and the write operation is logged. After the synchronization is complete, the log can be applied to the remote site. Logging is discussed further below.

Other technologies may also offer solutions for the on-line synchronization problem. Most RAID products can synchronize disks without interrupting normal operations. Investigating algorithms used in these products may provide additional solutions.

Capturing Data Updates

The key to capturing data updates is identifying the PXFS server operations that lead to modifications of the underlying file system. These operations fall into three categories: file data methods, file attribute methods, and directory methods. Methods on directory objects deal with creation, deletion, and naming of file and other directory objects. File data methods write file data to the underlying file system. File attribute methods change the attributes of files in the underlying file system. Table 1 lists the PXFS operations that must be replicated to the remote site ensure that the file state can be recovered after a failover occurs. These are standard PXFS operations and, for this reason, are not defined herein; however, appendix A shows.

TABLE 1

| Directory Object Methods | File Data Methods | File Attribute Methods |
|---|---|---|
| create_fobj | page_out | set_attributes |
| remove_fobj | write_out | set_secattr |
| create_symlink | sync | ioctl |
| rename_fobj | uiowrite | |
| link_fobj | fsync | |
| create_dir | | |
| remove_dir | | |

Once these operations are identified, there are two approaches to capturing state changes and recording them in the log 264 that can be implemented in Telescope 160:

1) Simulate the client call to the PXFS server 134. That is, record the PXFS server method invoked with enough arguments that the same call can be reproduced at the remote site.

2) Record only updates sent to the underlying file system through a vnode operation. PXFS server 134 operations that change the state of the underlying file system must do so through a vnode operation. Invocations of these vnode operations can be recorded and reproduced at the remote site.

The first approach provides a more highly available failover scenario. In this approach PXFS server 134 methods are encoded and transmitted to the remote site. The remote Telescope service 160R decodes the methods and invokes them on a remote instance of a PXFS server 156. In this manner, the remote Telescope service 16OR simulates a PXFS client 136. It also happens to be the sole PXFS client 136 that writes to the remote PXFS server 156. Thus, if a failover to the remote site is necessary, a PXFS; server instance 156 will already exist on the remote site, and it will be ready to accept requests from the PXFS clients 136. Furthermore, during normal operations, additional PXFS clients 136 can provide read-only access at the remote site. This is useful for CPU and IO-intensive procedures such as on-line backups, which should be avoided at the local site if at all possible.

The downside of the first approach is its complexity. For example, the parameters of vnode methods employed in the second approach are fewer and easier to encode than the parameters of PXFS server 134 methods employed in the first approach. In addition, calls from the PXFS server 134 to the underlying file system 148 on the local site, which are used in the vnode approach, are simple to isolate. Error conditions can be checked as the vnode methods return, to determine if the operation were successful and should be transmitted to the remote site. At the remote site decoded operations are applied directly to the underlying file system. In this manner, the remote Telescope service 160R acts as a PXFS server 156 rather than as a PXFS client 136, since it interacts directly with the underlying file system. Although the Telescope service 160R acts as a PXFS server 156 in this regard, it is not capable of any other PXFS server functionality, such as receiving requests from PXFS clients. Hence, in the event of a failover, a PXFS server 156 must be constructed from the underlying file system 154.

However, instantiating the PXFS server 156 does not affect failover too severely as failover is a time-consuming process already. On the other hand, by transmitting vnode methods rather than PXFS server methods, the remote site does not need to be a Galileo cluster. Also, no P)FS software is required at the remote site.

Logging

Referring again to FIG. 3, the replication log 264 is one of the most important components of the Telescope service 160. Very safe, 2-safe, and 1-safe modes all use a log to prevent the loss of transactions. The log entry format is also the format in which data is packaged and transmitted to the remote site. This section describes the design of the log, including its format and how logging operations are integrated into file system operations. This information is most appropriate for 1-safe mode, but generally carries over to 2-safe and very safe modes.

The first issue in the design of the log is its location. It is important that the log reside on the same physical machine as the PXFS server 134. This prevents the transmission of all log entries through ORB calls. If the PXFS server 134 is replicated using HA-PXFS, entries to the log 264 should also be replicated. Hence, the log should reside on a dual-ported disk, such as the disk 126.

The log 264 can be implemented as a regular file. The log size is preferably specified at its creation, allowing the log file 264 to be pre-allocated. If the log 264 is placed in the file system being replicated, it is important that replication of the log file be turned off. The log 264 can also be implemented as a raw device 128, somewhat like a swap partition. For simplicity, the remainder of this document will assume that the log 264 is implemented as a regular file accessible from the kernel 216 through the vnode interface 298. This file access method is described in reference to FIGS. 4 and 5.

There are advantages to placing the log 264 in a well-known location, whether in the file system or on a raw device. First, if this well-known location is in the file system being replicated, it would be easy to ensure that Telescope 160 does not attempt to replicate the log. More importantly, though, the log 264 must be retrievable after a system crash. This means its location must either be hard-coded into the retrieval code or recorded in a location hard-coded into the retrieval code. One possible location to record the location of the log file is the log anchor 230 (FIG. 3), which is described below. The log anchor 230 is considerably smaller than the log itself, especially in 1-safe mode.

Log entries are either physical, logical, or a hybrid of the two. A physical entry records the change in data at a certain location on the physical device or in a file. A logical entry records the operation that caused the change. Since PXFS is a high-level file system, it deals mostly in logical operations. That is, rather than specifying the layout of bits on a disk, it invokes operations on underlying file systems. For this reason, a logical logging approach is more appropriate for Telescope 160.

The format of a log entry 266 is shown in FIG. 3 and in FIG. 7. A log entry 266 consists of a header 268 and a body 279. All log entries 266 have headers 268 of identical size and layout, while bodies 279 can vary. Log record headers 268 must contain enough information to enable Telescope 160 to perform the following functions:

1) Traverse the log forward.
2) Traverse the log backward.
3) Find all log entries for a given transaction.
4) Determine the time a transaction started and finished.

Referring to FIG. 3, the headers 268 include the following fields, which enable Telescope 160 to perform the necessary functions:

| | |
|---|---|
| next_rec 270 | points to the header of the next log entry; |
| prev_rec 272 | points to the header of the previous log entry; |
| timestamp_rec 274 | the day and time of the current entry; |
| transaction_id 276 | an unique id associated with the current; |
| transaction_length 278 | the length of the current entry. |

As is apparent from the preceding fields, the log headers 268 organize log data into a linked list. Pointers to other elements in the list are implemented with log sequence numbers (LSNs). An LSN is used to identify a log record header by encoding its location in the log file.

The transaction_id 276 identifies the transaction the log entry is associated with. It is assigned by the log module when an operation is submitted by the PXFS server 134 to the log 264 for entry. It is returned to the PXFS server 134 as a result of the submission method. After the operation has completed, the PXFS server 134 sends the transaction_id 276 as an argument to a commit message to the log module. In a preferred embodiment, transaction ids 276 are implemented as monotonically increasing 64-bit integers, ensuring that the same transaction id is not used twice. However, any other type of unique id could also be used.

Figure 8:
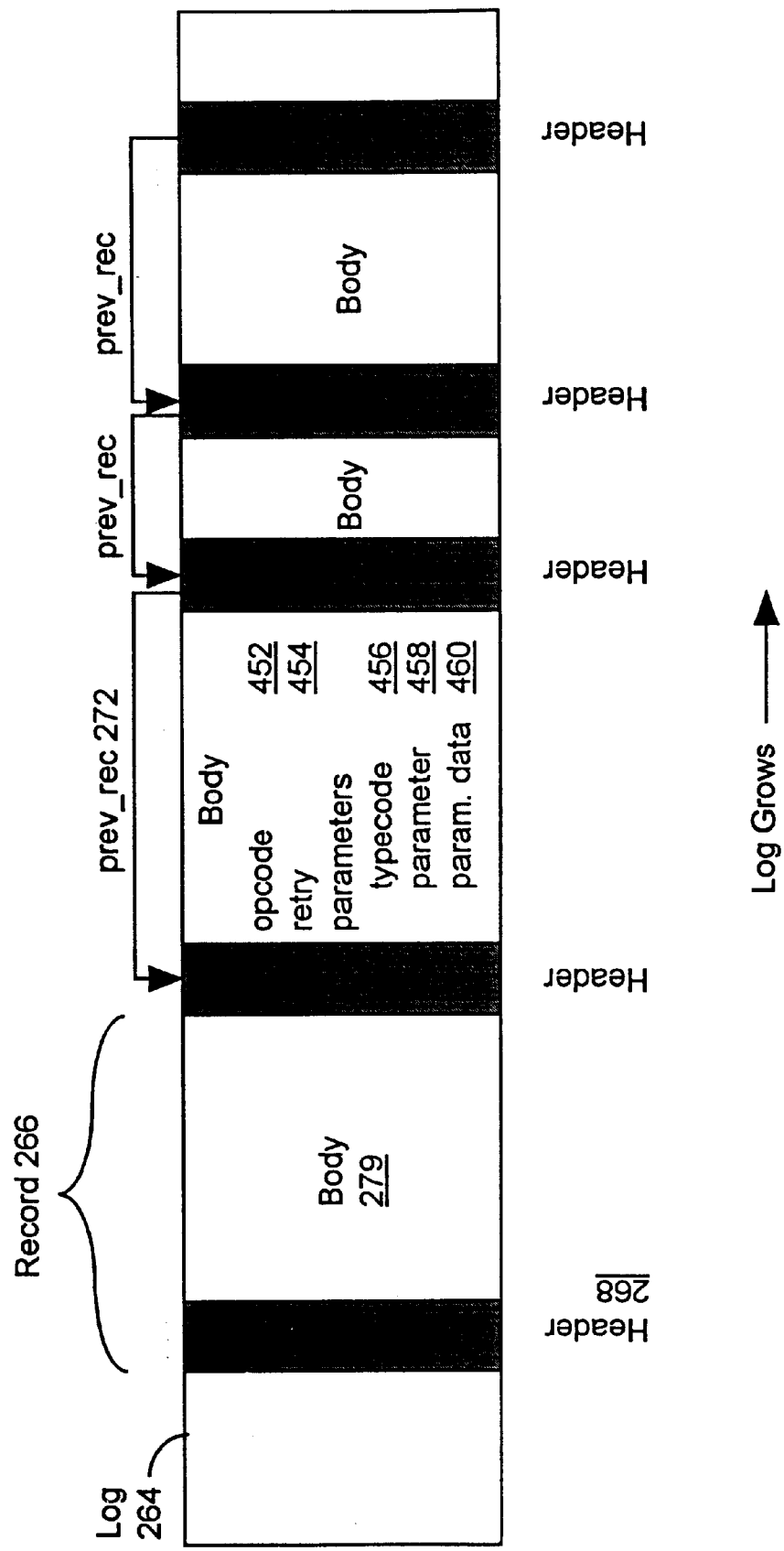
FIG. 8 is a diagram of the log file 264 of a preferred embodiment.

While log headers allow the next and previous record to be located from the current one, they do not indicate where a log traversal should start. This information is kept in a special data structure called the log anchor 230, which is illustrated in FIG. 3 and FIG. 8 (which shows the relationship between the log anchor 230 and the corresponding log file 264). The log anchor 230 stores the information necessary used to decode the log file and to reconstruct the log in the event of a system failure. For instance, the LSN of the most recently written log record header is stored in the anchor. Also included is the LSN of the most recent entry flushed to the remote site, as well as the most r recent entry acknowledged at the remote site. These entries allow Telescope to trace backwards through the log entries, determining which transactions were lost in the system failure. In particular, the log_anchor 230 includes the following fields:

| | |
|---|---|
| next_rec 242 | indicates the next available space for a log entry; |
| prev_rec 244 | indicates the header of the most recently written entry; |
| last_flushed 246 | points to the header of the last flushed log entry; |
| last_ACK 248 | points to the header of last log entry acknowledged by the remote telescope instance 160R; |
| circular 249 | a boolean that indicates if the log is circular; |
| timestamp_anchor 250 | the day and time of the current entry. |

Figure 9:
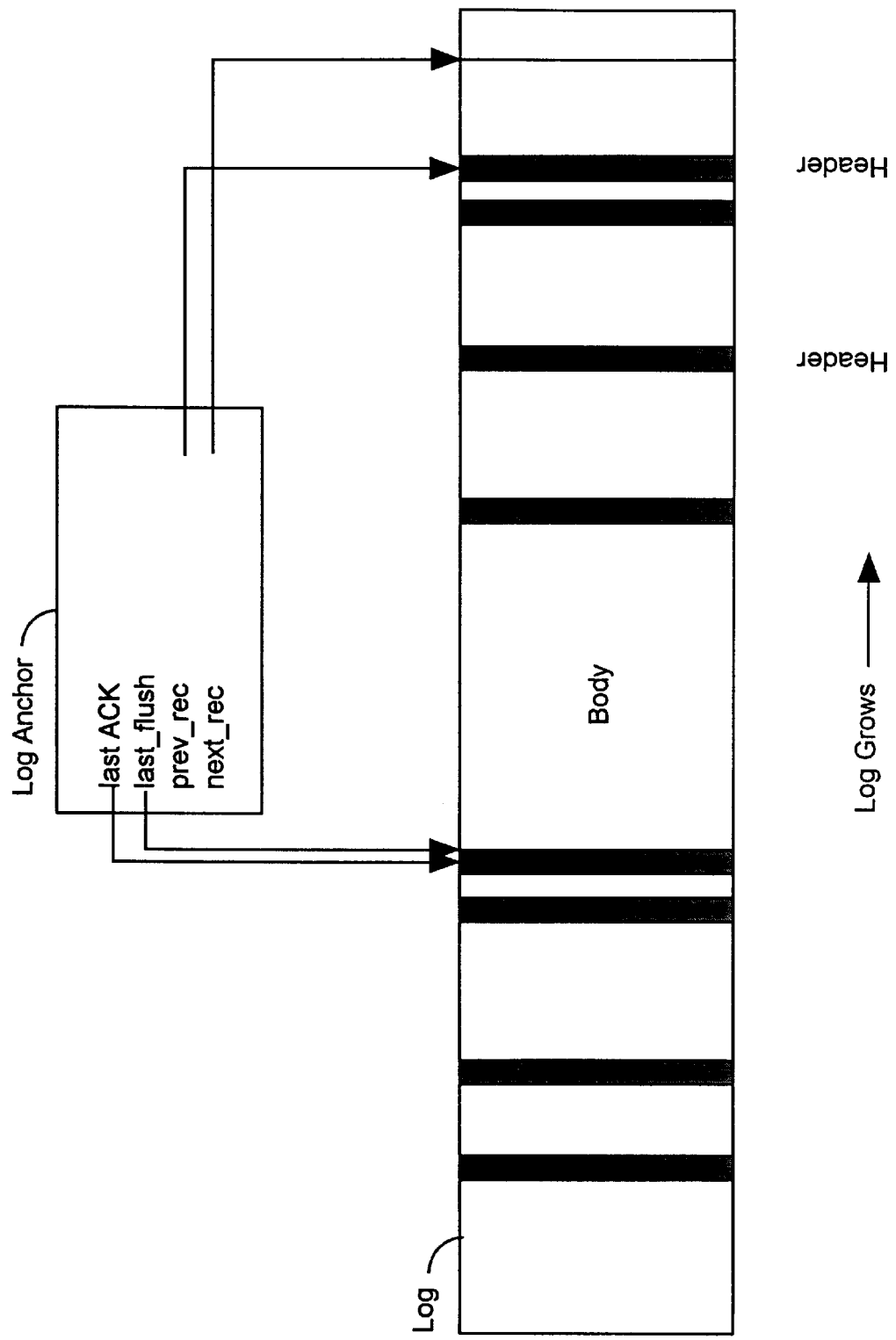
FIG. 9 is a diagram showing the relationship between the log file 264 of FIG. 8 and the log anchor of a preferred embodiment.

Referring to FIG. 9, there is depicted the relationship between the log 264 and the log_anchor fields immediately following a log flush. In this example, all data flushed to the remote site has been acknowledged, since the last_flushed and last_ACK pointers 246, 248 point to the same log entry. A flush writes the data from the last_flushed pointer 246 to the next_rec pointer 242. The space in the log file 214 after next_rec 242 is free for new log entries. In addition, if circular 249 is true, the space in the log file before last_ACK 248 is also free for reuse. If the log file is not restricted to a well-known location, the log anchor can also contain the log file pathname.

The log anchor is a frequently accessed data structure. For each log entry, the next_rec 242, prev_rec 244, and timestamp 250 fields are accessed and changed. For efficiency, the log anchor 230 is kept in the memory 204. For protection of log data, the log anchor 230 is periodically flushed to the disk 136, where, for the purposes of this description, it is called the flushed_log_anchor 280. Hence, after a system failure, the log anchor accessed by Telescope 160L may not actually represent the most recent state of the log 264. Instead, Telescope 160 traverses the log 264 in the forward direction, starting at the entry indicated by the prev_rec field 284 of the flushed log anchor 280, until it finds the tree last log entry. The last log entry can be marked in several ways. A dummy record header can be written immediately following it with timestamp entry before the current anchor timestamp 290. Alternatively, a special marker can be written at the end of the log that is cleared when a new entry is appended.

The log anchor 230 must be flushed to a well-known location on disk 136 so that it can be retrieved easily after a system crash. If the log file 264 is not in a well-known location, then the flushed log anchor 280 should also hold its pathname. There are a number of techniques to ensure that the log anchor 230, 280 as well as the log file 264, are always left in a consistent state. These techniques are important since writes to these files are not atomic with respect to unpredictable events, such as power failures. For a thorough discussion of logging techniques, see Chapter 9 of Gray and Reuter, which is entirely incorporated herein by reference.

Integrating Logging into the PXFS Server

One of the requirements of Telescope 160 is that the local and remote sites reach the same states, even though in 1-safe mode the remote site may lag behind the local site. One way to view this requirement is that the state on the local site equals the composition of the state on the remote site with the operations in the log 264. One scenario in which this requirement is threatened is if a fault at the local site causes downtime that does not last long enough to cause a site failover. In this situation, the log 264 should not fall out of sync with the file system 148, since it would lead to the remote site falling out of sync with the local site. This can be enforced with three rules:

1) On the local site, the order in which operations are recorded in the log must respect any higher-level locking or ordering constraints that controlled the order in which they were applied to the file system. That is, the log may not represent the exact order in which operations were applied to the file system since there is no central file system lock that is grabbed for every operation. On the other hand, the log 264 will be ordered by locks acquired on file systems and directories;

2) Operations must be applied to the remote site file system in the same order that they are recorded in the log;

3) On the local site, an operation is committed to the log if and only if it is committed to the file system.

The first rule does not quite guarantee that operations are recorded in the log in exactly the same order as they are applied to the file system. Operations on different files and directories can be recorded and applied in different orders. Operations on the same file or directory, though, will be guarded by file system or application-level locking. For instance, two threads will not be allowed to modify the same directory concurrently because the file system will impose some kind of locking. Without that locking scheme, the directory could get mangled. As long as the operations are recorded in the log while the directory lock is held, the log will represent the same ordering as the file system.

The ordering imposed by the first rule is worth little if not obeyed at the remote site. The remote site may wish to perform operations asynchronously with several threads to improve efficiency, but rule number two requires that the log ordering be preserved. If not, inconsistencies between the local and remote sites can result.

Ordering is irrelevant if operations are recorded in the log that were not applied to the file system, or vice versa. For instance, if an operation were applied to the file system and the system crashes before it is entered into the log, the log will not represent the difference between the local and remote sites. Similarly, if an operation is recorded in the log but for some reason it fails when applied to the file system, the log entry should be stricken or invalidated.

Preferably, a ready-commit protocol is used to record operations in the log 264. For 1-safe mode, the ready-commit protocol would proceed something like this:

1. Obtain the file system file or directory lock.
2. Record the operation in the log 264.
3. Perform the operation on the file system 148.
4. If the operation was successful, record a commit message in the log 264. Otherwise, record an invalidate message.
5. Release the file system file or directory lock.
6. Return results.

This protocol guards against failures at any stage of a file system state change. It does make one important assumption: updates to the file system must be either idempotent or testable. Idempotent operations have the same effect if applied one or many times. It can be determined if a testable operation has been performed without re-performing the operation. This assumption is needed to deal with a failure that occurs after step 2 and before step 4. Moreover, as described in reference to FIG. 10, this protocol is consistent with HA-PXFS, which makes the same assumption.

If an operation is recorded into the log 264 and there is no corresponding commit or invalidate message, it is unknown whether the operation was applied to the file system 148. If the operation is testable, whether it was performed can be determined. If it is not testable, rather than guess whether it was performed, the operation is simply applied again. Idempotency guarantees that if it was already applied, the resulting state will not change; however, for some operations an error will be returned from the underlying file system. For instance, if the operation was mkdir and step 3 had already completed, EEXIST will be returned by the file system 148. At this point, Telescope 160 does not know whether the original operation failed or the retry failed; consequently, the operation should also be performed at the remote site. There, if the operation succeeds, then the original operation on the local site had completed. If it fails, then the original operation on the local had not completed, and an error would have been returned if it had. A marker should be placed in the log entry indicating that an operation is a retry and may not have succeeded on the local. If this marker is present, the remote site need not sound any alarms if the operation fails, since it will have remained in a consistent state with the local.

The logging procedure described above differs slightly for 2-safe mode. Recall that in 2-safe mode, the operation must be transmitted and applied at the remote site before it can return on the local site. Hence, rather than write a commit message to the log in step 4 above, the entry recorded in step 2 is transmitted to the remote site. Step 5 is blocked until an acknowledgment is received from the remote site.

The logging procedure for the very safe mode is similar to that for the 2-safe mode except it uses a two-phase commit protocol.

Encoding Operations into the Log

In a preferred embodiment, all operations are encoded into the log 264 with the same format, illustrated in FIG. 8. Log entries/records 266 all begin with a log record header 268, which has been described in reference to FIG. 3. The log record header 268 provides the timestamp 274, the transaction id 276, and the length 278 of the log entry. The body 279 of the entry starts with an opcode 452 that identifies the encoded operation. Next is a retry marker 454 that indicates whether the operation is possibly a retry, and hence whether the error can be disregarded on the remote site. Following the opcode 452 and retry marker 454 is the list of parameters. Each parameter is contained in a structure containing a typecode 456, the length of the parameter 458 and the parameter data 460. With this structure it is easy to efficiently transmit any parameter as long as its typecode 456 is known at both the local and remote sites.

Not all of the parameters of an operation need to be transmitted. Some parameters can be simulated at the remote site. For instance, credobjs do not need to be relayed. (Note: a credobj is an object that contains user credentials; e.g., user id, group id, etc.). This is because the remote Telescope service 160R should be able to produce credobjs to access its local file system 154. Appendix A lists the method prototypes from Table I along with the parameters that must be transmitted for each method. These method prototypes are written in standard C++, whose conventions it is beyond the scope of the present application to describe.

Commit and invalidate messages are also encoded into the log 264 with the format illustrated in FIG. 8. Commit and invalidate messages are each assigned a special opcode 452. They are linked to the log record 266 being committed or invalidated by the transaction id 276 in the log record header 268. In the current design, invalidate messages do not involve any parameters. Commit messages, however, preferably include naming information. As described above, the naming framework is maintained with log messages (FIGS. 2, 6, 7) indicating changes in the file system 148 namespace. Each time an operation is invoked at the local site that changes the name (or state) of a file system object, a name-to-fobjid_t mapping is entered in the log 264 (presuming that the naming/logging method of FIG. 7 is employed). In the logging proCEdure described above, the details of the operation (e.g., opcode and parameters) are recorded prior to its completion. Hence, the new fojid_t, which must be transmitted to the remote site, is not known at the local site until after the initial log record is written. As an optimization, rather than creating a new log entry, the new fobjid_t is recorded in the commit message for the transaction that caused it. The operations that require naming data in the commit message are noted in Appendix A. These and similar messages are written to the log file in the methods described in reference to FIGS. 6 or 7 or other, similar, methods.

HA-PXFS

In an alternate embodiment, the Telescope software 160 is modified to function within the context of HA-PXFS 228 (FIG. 3), which extends the PXFS server 134 to handle failures with a relatively short service interruption. Since Telescope 160 is implemented in the PXFS server 134 it can take advantage of the protection offered by HA-PXFS 228. The Telescope service 160L does not need to deal with some of the complex high availability issues important to HA-PXFS 228. For instance, Telescope 160 does not checkpoint locks to the remote site. The Telescope service 160L replicates data rather than application state; after a site failure, applications will have to be restarted. Since HA-PXFS 228 provides failover that is transparent to clients 124, it does not have the luxury of disregarding these issues. The HA-PXFS architecture and necessary modifications to Telescope 160 are now described in reference to FIG. 10.

Figure 10:
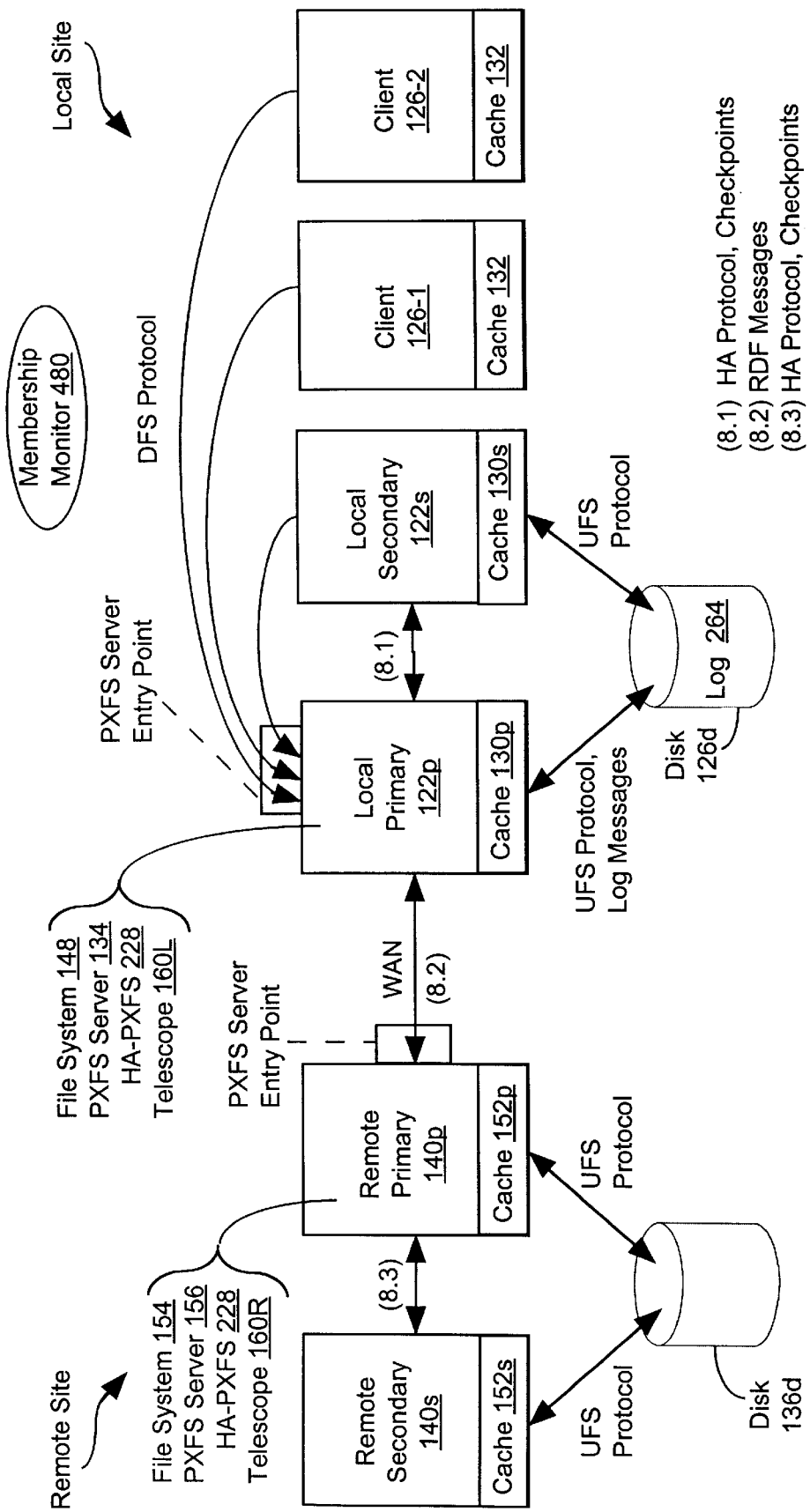
FIG. 10 is a block diagram of a preferred embodiment of a geographic replication system wherein the local and remote sites include primary and secondary file servers configured to be highly available.

Referring to FIG. 10, The HA-PXFS architecture is based on a primary and a secondary server 122p, 122s (not to be confused with Telescope's local and secondary sites) that share a dual-ported disk 126d. This system operates similarly to the preferred embodiment described in reference FIG. 3 except for differences which are now described. PXFS server requests are handled by the primary server 122p. Each request is checkpointed to the secondary server 122s so that it can take over transparently if the primary server fails. When the Galileo cluster membership monitor 480 detects failure of the primary server 122p, the secondary server 122s is notified. The secondary server 122s mounts the file system 148 and obtains PXFS file objects from checkpointed fobjid_t pointers. If an operation was in progress at the time of the failure, the secondary server 122s completes it. Operations are encapsulated in mini-transactions to guarantee exactly-once semantics. Mini-transactions are described in detail in U.S. patent application Ser. No. 08/829,156, "Method and System for Achieving High Availability in Networked Computer Systems," by Matena et al., filed Marc. 31, 1997, which is entirely incorporated herein by reference.

Integrating Telescope with HA-PXFS focuses on three problems:

1) Checkpointing the proper Telescope state from primary to secondary server.
2) Inserting log entries or transmissions into mini-transactions.
3) Regaining access to the Telescope log from the secondary server after a failure.

The Telescope state checkpointed (messages (8.1)) from the primary 122p to the secondary server 122s includes the transaction id 276 and the log anchor 230. Both checkpointed elements are necessary for efficient recovery of the Telescope log 264. They are both kept in memory on the primary server 122p, and thus a disk read is not necessary to register the checkpoint. The log anchor (described in reference to FIG. 3) contains data to find the log file and to locate the next location for an entry. The transaction id allows the secondary server 122s to track the increase of transaction_id values, preventing the accidental reuse of a transaction id 276. It also allows Telescope 160L to check if an operation in progress during the primary server failure was committed to the Telescope log 264.

Telescope log entries can be integrated with the operations in HA-PXFS mini-transactions. Without Telescope 160, the sequence of events in HA-PXFS to satisfy a client request is as follows:

1. Client sends request.
2. Primary sends checkpoint with state data.
3. Secondary allocates state object and acknowledges checkpoint.
4. Primary updates storage.
5. Primary returns results.
6. Client sends asynchronous forget message to secondary.

The Telescope logging procedure (described above) enhances this sequence by adding an additional step after steps 1 and 4 as follows (the added steps are bolded):

1. Client sends request.
1.1 Primary 122p enters request into log and receives a transaction id.
2. Primary sends checkpoint with state data.
3. Secondary 122s allocate state object and acknowledges checkpoint.
4. Primary 122p updates storage.
4.1 Primary 122p enters commit or invalidate message into log, depending on whether operation was successful.
5. Primary 122p returns results.
6. Client 126 sends asynchronous forget message to secondary.

This algorithm guarantees that the secondary server 122s is able to restart the Telescope service 160 in a consistent state. Failures can occur in several places relative to the Telescope log operations:

1) If the primary server fails before step 2, there will be no record that the request was ever received. The Galileo replication framework will resend the request to the secondary server.
2) If the primary fails between steps 2 and 3, the request will appear in the log but not in the file system, and no state will be checkpointed to the secondary server. In this case, the secondary server should consult its most recent checkpointed log anchor. If additional log entries have been made but not checkpointed, they will be found at the next_rec pointer 242 (FIG. 3) in the log anchor. Since the request will be resent by the Galileo replication framework, any such log entries should be nullified by the secondary server with an invalidate log entry.

3) Once the transaction id of the current operation is checkpointed to the secondary server, primary site failures become easier. If the secondary retries the operation, a new log entry need not be recorded since one already exists. A commit or invalidate message is recorded depending on whether the operation is deemed successful or not. If the former primary had recorded a commit message (hence the failure was between steps 6 and 7), an additional commit message will be disregarded.

Consequently, the failover algorithm for restarting Telescope 160 after a failure of the primary 122p is as follows:

1. Perform HA-PXFS failover, including locking out operations, mounting the file system, and obtaining vnode pointers.
2. Locate the log file 214, either from the last checkpointed log anchor 230 or from a wellknown location on the shared disk 126.
3. Using the next_rec pointer 242 from the last checkpointed log anchor 230, check if additional log entries have been made without being checkpointed. If so, obtain the transaction_ids 276 from these entries and log invalidate messages (the requests will be retried).
4. Update the log anchor data structure 230.

The algorithms described in this section concentrate on the 1-safe mode of operation. They change little for 2-safe mode. For example, rather than entering a commit message into the log 264 in step 4.1 above, the primary site transmits the log entry 266 created in step 2 to the remote site. The primary 122p does not return results (step 5) until an acknowledgment is received from the remote site. If multiple copies of the log entry 266 are transmitted to the remote site during a failover, they will be identified as duplicates by the transaction id and only the first will be processed. Note that Telescope 160 relies on the Galileo replication framework to direct all messages from the remote site to the new primary server (e.g., the secondary local server 122s) after a failure.

Data Transmission

In a preferred embodiment Telescope 160 transmits data using standard Unix socket utilities. Using a high-level interface allows Telescope to function across any number of physical networks via any number of networking protocols. TCP/IP is suggested for its reliability and throughput. If a dedicated link can be established between the local and remote sites, Telescope performance, especially in 2-safe or very safe modes, improves significantly. In any case, it is important to determine in advance that the network bandwidth can match the bandwidth of the storage system in use. Techniques such as data compression can be used to alleviate network bandwidth problems, but at the cost of increased latency.

The details of establishing and maintaining a connection between sites depends on Galileo's global networking capabilities. The present invention does not exclude any manner of establishing and maintaining such a connection.

Setting up a Connection

The connection setup procedure is one that can evolve over successive Telescope versions. The only required capability is some means of establishing a pair of socket connections between the primary and remote sites. Initially, IP addresses and port names can be entered manually at both sites. Over time, an automatic setup protocol can be established.

The automatic setup protocol would likely be based on a well-known Telescope control port. The control port would be used exclusively for establishing connections between primary and remote sites. To enable a remote site, the remote Telescope service (described in Section 4.9) would be started on a Galileo cluster. It would wait for connection requests on the control port. After receiving a connection request, the remote Telescope service would somehow indicate the replication resources it had available—for instance, free disk partitions and their sizes as well as perceived network bandwidth and latency between sites. The primary site would indicate the replication resources it required, and a pair of socket connections would be established for two-way communication between sites.

Transmitting Data to the Remote Site

Replication data is preceded by a Telescope header. The Telescope header indicates the mode of transmission (1-safe, 2-safe, or very-safe) as well as the length of the transmission. The mode of the transmission indicates what action the remote site should take upon receiving the packet. In 2-safe and very safe modes, latency is critical. The remote site should perform the encoded operation and return an acknowledgment as quickly as possible. In 1-safe mode, latency is not as important, and it is sometimes necessary to receive the entire contents of a large transmission before any action can be taken. The length field in the header indicates how many bytes the receiver should expect from the body of the transmission. This simplifies receiving the data from a streams interface.

The header should include two other fields that may not be incorporated into the initial version of Telescope but may be important later. First, in order to conserve network bandwidth, transmitted data may be compressed. If compression algorithms vary, a header field may be necessary to indicate the proper decompression algorithm. Second, Telescope may need to provide its own authentication and encryption services. If this is necessary, a header field may be necessary for an authentication or encryption key.

The body of the transmission consists of log entries. In 2-safe and very safe mode, only one entry should be transmitted at a time, though optimizations might allow concurrent transmissions for concurrent accesses. In 1-safe mode, the contents of the log can be transmitted in large fragments. Telescope places no size limit on the body of the transmission; however, limitations on buffer space on the sending and receiving sides should be considered.

Transmission in 2-safe and very safe modes is governed by their algorithms. 1-safe mode, on the other hand, is much more flexible. The interval at which transmission occurs should be affected by several factors:

The size of the log.

The rate at which entries are recorded in the log.

The rate at which the log can be flushed once transmission begins.

The acceptable consistency lag between the primary and remote sites.

Under normal circumstances, Telescope 160 will use a circular log 264. Circular logs recycle space by reusing parts of the log that are no longer needed. For instance, if the contents of a region of a log file are transmitted to the remote site and acknowledged, then that region of the log file can be reused. There are reasons to not use circular logs. For instance, the contents of the log can be used to audit the operations that were applied to the file system. In this case, the log file 264 must be able to grow indefinitely, or multiple log files should be used. In either the circular or non-circular case, if the log fills up, the transmission parameters were not properly configured. The Telescope management API (which is not described herein) contains methods for setting the 1-safe transmission interval.

Transmission in 1-safe mode is based on parameters stored in the log anchor. When a transmission is initiated, a snapshot is taken of the last_flush and prev_lsn fields. These LSNs define the region of the log that will be transmitted. Since the transmission does not affect the end of the log, no lock on the log is required to read data from the transmission region. It is recommended that the transmission be performed by a dedicated thread so that file system operations appending new records to the log are not affected.

The dedicated thread transmits the region of the log through the socket connection already established. It waits for acknowledgment of all data transmitted before making itself available for the next log flush. Simple network protocol acknowledgments are not sufficient—an acknowledgment must be received from the remote Telescope service 160R that the transmitted operations have been applied to the file system on the remote site.

This transmission scheme can be enhanced to allow multiple concurrent threads to transmit data to the remote site. While the remote site applies one set of operations to the remote file system, another the next set of operations can be traveling across the network. This scheme is more complicated with respect to identifying lost transmissions. Since the remote Telescope service 160R will preserve the chronological order of the log 264, log regions transmitted by separate threads cannot be allowed to pass each other in transit.

Referring to FIG. 3, during the log flush procedure, the log anchor is updated to reflect the current status of the transmission. The last_ACK field 248 is written whenever the primary site receives acknowledgment that operations were applied to the remote site. The last_flush field 246 is written whenever data is transmitted. It is almost impossible for last_ACK 248 to point to a chronologically later position in the log than the last_flush field. In the single thread case, a new log flush cannot start until the last_ACK and last_flush fields 248, 246 are the same.

Synchronization

Synchronization data can be transmitted in a special protocol, or it can be encoded as log entries. Using log entries should be the easier approach, as it avoids the need for another method of encapsulating data. For instance, to indicate that a file should be copied from the primary site to the remote site, two log entries 266 can be used as follows:

1. A file create entry will indicate the file's pathname and the identifier the primary site will use for future transmissions regarding this file; and
2. A file write entry will can be used to transmit the file's contents to the remote site.

If file timestamps must be preserved, these can be transmitted through attribute log entries. For greater efficiency, multiple encoded entries can be batched and transmitted together.

Remote Site

Most of the Telescope services 160R required at the remote site have already been discussed, but are briefly summarized herein.

The remote site has the following duties:
1) Accept requests for replication;
2) Decode and replay log entries; and
3) Provide a PXFS server for read-only access during normal operation read-write access after failover.

Failure

There are several different types of failures that Telescope must account for. One, failure of a PXFS server at the primary site, has already been discussed. Another, failure of the primary site, is the principal reason Telescope exists. Other failures accounted for by Telescope 160 include:

1) Failure of an operation when. applied at the remote site that succeeded at the primary site;
2) Failure of the synchronization procedure;
3) Failure of the remote Telescope service (including failure of the node hosting the remote Telescope service);
4) Failure of the remote site; and
5) Failure of the interconnect between the primary and remote sites.

While the present invention does not describe how each of these failures are specifically dealt with by Telescope 160, it should be apparent from the preceding discussion how such failures are accounted for by the Telescope service 160.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Appendix A. Encoded Operations and Parameters

The following lists the C++ prototypes for the checkpointed methods in Table 1 and indicates which parameters must be transmitted to the remote site by the geographical replication software (i.e., the Telescope service 160). All f_obj and derivative types are sent as fobjid_ts. Each prototype also indicates the class of which it is a member. The class instance on which the method is invoked is referred to as this. Other terms used in this Appendix include:

sol: the class that defined Solaris errors, types, etc.

dirprov: the class that implements directory operations.

mempager: the class that implements paging operations.

io_ii: the class that implements i/o (input/output) operations.

fobj_ii: the class that implements all generic file operations.

A.1 create_fobj sol:: error_t dirprov_ii::create_fobj(const char *nm, const sol::vattr_t& attr, sol::vcexcl_t exclflag, Long mode, fs::fobj_out fobj, fs::fobj_info& fobjinfo, ULong& key, solobj::cred_ptr credobj, Long flag, Environment&_environment);

Transmit: this, nm, aftr, exclf lag, mode. At commit, transmit f obj.

A.2 remove_fobj sol:: error_t dirprov_ii::remove_fobj(const char *nary, solobj::cred_ ptr credobj, Environment&_environment);

Transmit: this, nm.

A.3 create_symlink sol:: error_t dirprov_ii::create_symlink(const char *nary, const sol::vattr_t& attr, const char *targetpath, solobj::cred_ptr credobj, Environment&_environment);

Transmit: this, nm, aftr, targetpath.

A.4 create_dir sol:: error_t dirprov_ii::create_dir(const char *(dirnm, const sol::vattr_t& attr, fs::unixdir_out newdir, ULong& key, solobj::cred_ptr credobj, Environment&_environment);

Transmit: this,dirnm,attr. At commit, transmit newdir.

A.5 remove_dir sol:: error t dirprov_ii::remove_dir(const char *dirnm, fs::unixdir_ptr cur_dir, solobj::cred_ptr credobj, Environment&_environment);

Transmit: this, dirnm, cur_dir.

A.6 rename_fObi sol::error t dirprov_ii::rename_fobj(const chair *sourcenm, fs::unixdir_ptr target_dir, const char *targetnm, solobj::cred_ptr credobj, Environment&_environment);

Transmit: this, sourcenm, target_dir, targetnm.

A.7 page_out void mempager_ii::page_out(sol::u_offset_t offset, sol::size_t length, Boolean set_size, bulkio::in_pages_ptr pglobj, solobj::cred_ptr credobj, Environment&_environment);

Transmit: this,offset,length,set_size, extract data from pages.

A.8 write_out void mempager_ii::write_out(sol::u_offset_t offset, sol::size_t length, Boolean set_size, bulkio::in_pages_ptr pglobj, solobj::cred_ptr credobj, Environment&_environment);

Transmit: this, offset, length, set_size, extract data from pages.

A.9 sync void mempager_ii::sync(sol::u_offset_t offset, sol::size_t length, Boolean set_size, Long, bulkio::in_pages_ptr pglobj, solobj::cred_ptr credobj, Environment&_environment);

Transmit: this, offset, length, set_size, extract data from pages.

A.10 uiowrite sol::error_t io_ii::uiowrite(sol::u_offset_t off, sol::size_t& len, bulkio::in_uio_ptr uioobj, Long ioflag, solobj::cred_ptr credobj, Environment&_environment);

Transmit: this, off, len.

A.11 fsync sol::error_t io_ii::faync(Long syncflag, solobj::cred_ptr credobj, Environment&_environment); Transmit: this, syrncflag.

A.12 set_attributes sol::error_t fobj_ii::set_attributes(const sol::vattr_t& attr, solobj::cred_ptr credobj, Environment&_environment);

Transmit:. this,aftr.

A.13 set secattributes sol:: error t fobj_ii::set_secattributes(const fs::secattr& sattr, Long secattrfiag, solobj::cred_ptr credobj, Environment&_environment);

Transmit: this, sattr, secattrflag.

A.14 write_all_attr void fobjprov_ii::write_all_attr(sol::vattr_t& attributes, solobj::cred_ptr credobj, Environment&_environment);

Transmit: this, attributes.

A.15 ioctl sol:: error_t fobj_ii::ioctl(Long nodeid, Long pid, Long iocmd, Long arg, Long flag, Long& result, solobj::cred_ptr credobj, Environment&_environment);

Transmit: iocmd, arg, flag.

What is claimed is:

1. A geographical data replication system comprising:

a local site having at least one local server running a first file system, at least one client and first stable file storage, the local server being configured to serve via the first file system file requests from the at least one client;

a remote site having at least one remote server running a second file system and second stable file storage;

a network connecting the local and remote sites;

the local server, being configured to intercept the file requests and to determine which of the file requests is one of a first set of file requests that will alter file state of the first file system;

a log file stored on the first stable file storage in which the local server writes operations and data required to replicate changes to the file state of the first file system resulting from performing the first set of file requests, the local server being configured to periodically flush the log file to the remote site;

a first identifier maintained by the first file system for each of the files on the first stable file storage, the first identifier being transmitted by the local server to the remote server for each of the flushed files;

a second identifier maintained by the second file system for each of the flushed files replicated on the remote server; and a mapping table on the remote server that maintains a mapping between the first and second identifiers enabling the remote server to serve the requests from the clients;

the remote server being configured to update state of the second file system in accordance with the flushed log file by performing the operations on the data represented in the flushed log file;

such that, whenever failover occurs from the local to the remote server, the remote server is able to serve the requests from the clients with little or no loss of file state.

2. The geographical data replication system of claim 1, wherein the second stable file storage is not required to be identical to the first stable file storage.

3. The geographical data replication system of claim 1, wherein the local site includes a cache that the first file system uses to satisfy the requests before applying the requests to the first stable file storage;

such that the local server is configured to intercept only those file requests that are applied by the first file system to the first stable file storage.

4. The geographical data replication system of claim 1, wherein the first and second file systems are PXFS.

5. The geographical data replication system of claim 4, wherein:
   the first identifier is a persistent local identifier of the flushed file on the local site; and
   the second identifier is a remote identifier of the flushed file on the remote site.

6. The geographical data replication system of claim 4, wherein:
   the first identifier includes a persistent local directory identifier of a directory on the local site in which the flushed file is stored and a persistent local name identifier associated with a name on the local site identifying the flushed file; and
   the second identifier includes a remote directory identifier of a directory on the remote site in which the flushed file is stored and a remote name identifier associated with a name on the remote site identifying the flushed file.

7. A geographical data replication system comprising:
   a local site having at least one local server running a first file system, at least one client and first stable file storage, the local server being configured to serve via the first file system file requests from the at least one client;
   a remote site having at least one remote server running a second file system and second stable file storage;
   a network connecting the local and remote sites;
   the local server, being configured to intercept the file requests and to determine which of the file requests is one of a first set of file requests that will alter file state of the first file system; and
   a log file stored on the first stable file storage in which the local server writes operations and data required to replicate changes to the file state of the first file system resulting from performing the first set of file requests, the local server being configured to periodically flush the log file to the remote site;
   the remote server being configured to update state of the second file system in accordance with the flushed log file by performing the operations on the data represented in the flushed log file;
   such that, whenever failover occurs from the local to the remote server, the remote server is able to serve the requests from the clients with little or no loss of file state;
   wherein
   the first and second file systems are PXFS;
   the first set of file requests that will alter state of the first file system include selected file data methods file attribute methods and directory methods;
   the file data methods include
      page_out;
      write_out;
      sync;
      uiowrite; and
      fsync;
   the file attribute methods include:
      set_attributes;
      set_secattr;
      ioctl; and
   the directory methods include:
      create_fobj;
      remove_fobj;
      create_symlink;
      rename_fobj;
      link_fobj;
      create_dir; and
      remove_dir.

8. The geographical data replication system of claim 1, wherein the log comprises:
   a plurality of records, each of the records including:
      a body holding file information identifying, among other things, a respective file operation and its associated data, and
      a file header enabling the geographical replication systems to decode the log, including the body.

9. The geographical data replication system of claim 8, wherein the local server includes a log anchor indicating:
   which of the records in the log file were last flushed; and
   location of next record to be written to the log file.

10. The geographical data replication system of claim 1, wherein the local and remote servers operate in respective modes that define the file state coherency between the local and the remote sites.

11. The geographical data replication system of claim 10, wherein the file state is one of 1-safe, 2-safe and very-safe.

12. The geographical data replication system of claim 1, wherein the data comprises one of;
   partitions;
   and files.

13. The geographical data replication system of claim 1, wherein the local server comprises one of:
   a cluster; and
   a single server.

14. A method for geographical data replication that can be implemented in a computer network including a local site with a local server and at least one client configured to issue file requests to a first file system run by the local server and a remote site with a remote server running a second file system that is interoperable with the first file system, comprising:
   the local server:
      intercepting the file requests;
      determining which of the file requests is one of a first set of file requests that will alter file state of the first file system;
      writing to a persistent log file operations and data required to replicate changes to the file state of the first file system resulting from performing the first set of file requests;
      periodically flushing the log file to the remote site; and
      transmitting to the remote server for each of the flushed files a first identifier maintained by the first file system for each of the files on the first stable file storage; and
   the remote server:
      updating state of the second file system in accordance with the flushed log file; and
      mapping the first identifier to a second identifier maintained by the second file system for each of the flushed files, enabling the remote server to serve the requests from the clients;
   such that, whenever failover occurs from the local to the remote server, the remote server is able to serve the requests from the clients with little or no loss of file state.

15. the method of claim 14, wherein the updating step performed by the remote server comprises:

performing the operations on the data represented in the flushed log file.

16. The method of claim 14, wherein:

the local site includes a cache that the first file system uses to satisfy the requests before applying the requests to a first stable file storage; and the intercepting step is only performed on those file requests that are applied by the first file system to the first stable file storage.

17. The method of claim 16 wherein the first and second file systems are PXFS.

18. The method of claim 17, wherein:

the first identifier is a persistent local identifier of the flushed file on the local site; and the second identifier is a remote identifier of the flushed file on the remote site.

19. The method of claim 20, wherein:

the first identifier includes a persistent local directory identifier of a directory on the local site in which the flushed file is stored and a persistent local name identifier associated with a name on the local site identifying the flushed file; and the second identifier includes a remote directory identifier of a directory on the remote site in which the flushed file is stored and a remote name identifier associated with a name on the remote site identifying the flushed file.

20. A method for geographical data replication that can be implemented in a computer network including a local site with a local server and at least one client configured to issue file requests to a first file system run by the local server and a remote site with a remote server running a second file system that is interoperable with the first file system, comprising:

the local server:
intercepting the file requests;
determining which of the file requests is one of a first set of file requests that will alter file state of the first file system;
writing to a persistent log file operations and data required to replicate changes to the file state of the first file system resulting from performing the first set of file requests; and
periodically flushing the log file to the remote site; and the remote server:
updating state of the second file system in accordance with the flushed log file;
such that, whenever failover occurs from the local to the remote server, the remote server is able to serve the requests from the clients with little or no loss of file state;

wherein
the first set of file requests that will alter state of the first file system include selected file data methods, file attribute methods, and directory methods;
the first and second file systems are PXFS;
the file data methods include
page__out;
write__out;
sync;
uiowrite; and
fsync;

the file attribute methods include:
set__attributes;
set__secattr;
ioctl; and the directory methods include:
create__fobj;
remove__fobj;
create__symlink;
rename__fobj;
ink__fobj;
create__dir; and
remove__dir.

21. The method of claim 14, wherein the log file comprises:

a plurality of records, each of the records including:
a body holding file information identifying, among other things, a respective file operation and its associated data, and
a file header enabling the geographical replication systems to decode the log, including the body.

22. The method of claim 21, further comprising:

the local server maintaining a log anchor indicating:
which of the records in the log file were last flushed; and
location of next record to be written to the log file.

23. The method of claim 14, further comprising:

the local and remote servers operating in respective modes that define the file state coherency between the local and the remote sites.

24. The method of claim 23, wherein the file state is one of 1-safe, 2-safe and very-safe.

25. The method of claim 14, wherein the data comprises one of;

partitions;
and files.

26. The method of claim 14, wherein the local server comprises one of:

a cluster; and
a single server.

27. A computer program product for providing geographical data replication in a computer network including a local site with a local server and at least one client configured to issue file requests to a first file system run by the local server and a remote site with a remote server running a second file system that is interoperable, the first file system maintaining a first identifier for each file on the first stable file storage, the computer program product including a computer readable storage medium and a computer program mechanism embedded therein, the computer program mechanism comprising:

local geographical data replication software that configures the local server to:
intercept the file requests;
determine which of the file requests is one of a first set of file requests that will alter file state of the first file system;
write to a persistent log file operations and data required to replicate changes to the file state of the first file system resulting from performing the first set of file requests;
periodically flush the log file to the remote site; and
pass to the remote server the first identifier for each of the flushed files; and remote geographical replication software that configures the remote server to: update state of the second file system in accordance with the flushed log file by performing the operations on the data represented in the flushed log file, maintain a second identifier for each of the flushed files replicated on the remote server, and maintain a mapping table on the remote server that maintains a mapping between the first and second identifiers, enabling the remote server to serve the requests from the clients;

such that, whenever failover occurs from the local to the remote server, the remote server is able to serve the requests from the clients with little or no loss of file state.

28. The computer program product of claim 27, wherein the second stable file storage is not required to be identical to the first stable file storage.

29. The computer program product of claim 27, wherein:
the local site includes a cache that the first file system uses to satisfy the requests before applying the requests to a first stable file storage; and
the local server is configured to intercept only those requests that are applied by the first file system to the first stable file storage.

30. The computer program product of claim 27, wherein the first and second file systems are PXFS.

31. The computer program product of claim 30, wherein:
the first identifier is a persistent local identifier of the flushed file on the local site; and
the second identifier is a remote identifier of the flushed file on the remote site.

32. The computer program product of claim 30, wherein:
the first identifier includes a persistent local directory identifier of a directory on the local site in .which the flushed file is stored and a persistent local name identifier associated with a name on the local site identifying the flushed file; and
the second identifier includes a remote directory identifier of a directory on the remote site in which the flushed file is stored and a remote name identifier associated with a name on the remote site identifying the flushed file.

33. The computer program product of claim 27, wherein the first set of file requests that will alter state of the first file system include selected:
file data methods;
file attribute methods; and
directory methods.

34. A computer program product A computer program product for providing geographical data replication in a computer network including a local site with a local server and at least one client configured to issue file requests to a first file system run by the local server and a remote site with a remote server running a second file system that is interoperable, the computer program product including a computer readable storage medium and a computer program mechanism embedded therein, the computer program mechanism comprising:
local geographical data replication software that configures the local server to:
intercept the file requests;
determine which of the file requests is one of a first set of file requests that will alter file state of the first file system;
write to a persistent log file operations and data required to replicate chances to the file state of the first file system resulting from performing the first set of file requests; and
periodically flush the log file to the remote site; and
remote geographical replication software that configures the remote server to: update state of the second file system in accordance with the flushed log file by performing the operations on the data represented in the flushed log file;
such that, whenever failover occurs from the local to the remote server, the remote server is able to serve the requests from the clients with little or no loss of file state;
wherein
the first set of file requests that will alter state of the first file system include selected file data methods, file attribute methods and directory methods;
the first and second file systems are PXFS:
the file data methods include
page__out;
write__out;
sync;
uiowrite; and
fsync;
the file attribute methods include:
set__attributes;
set__secattr;
ioctl; and
the directory methods include:
create__fobj;
remove__fobj;
create__symlink;
rename__fobj;
link__fobj;
create__dir; and
remove__dir.

35. The computer program product of claim 27, wherein the log file comprises:
a plurality of records, each of the records including:
a body holding file information identifying, among other things, a respective file operation and its associated data, and
a file header enabling the local and remote servers to decode the log, including the body.

36. The computer program product of claim 35, wherein the local server is configured to maintain a log anchor indicating:
which of the records in the log file were last flushed; and
location of next record to be written to the log file.

37. The computer program product of claim 36, wherein the local and remote servers are configured to operate in respective modes that define the file state coherency between the local and the remote sites.

38. The computer program product of claim 37, wherein the file state is one of 1-safe, 2-safe and very-safe.

39. The computer program product of claim 27, wherein the data comprises one of;
partitions;
and files.

40. The computer program product of claim 27, wherein the local server comprises one of:
a cluster; and
a single server.

41. A geographical data replication system comprising:
a local server configured to intercept file requests directed to a first file system and to determine which of the file requests is one of a first set of file requests that will alter file state of the first file system and to maintain a first identifier for each file in the first file system; and a persistent log file in which the local server writes operations and data required to replicate changes to the file state of the first file system resulting from performing the first set of file requests, the local server being configured to periodically flush the log file to a remote server;

the remote server being configured to: update state of a second file system in accordance with the flushed log file by performing the operations on the data represented in the flushed log file, maintain a second identifier for each of the files flushed to the remote server, and maintain a mapping table on the remote server that maintains a mapping between the first and second identifiers, enabling the remote server to serve the requests from the clients;

such that, whenever failover occurs from the local to the remote server, the remote server is able to serve the file requests with little or no loss of file state.

42. A method for geographical data replication, comprising:

on a local server:
intercepting file requests directed to a first file system;
determining which of the file requests is one of a first set of file requests that will alter file state of the first file system;
writing to a persistent log file operations and data required to replicate changes to the file state of the first file system resulting from performing the first set of file requests;
maintain a first identifier for each file in the first file system, and
periodically flushing the log file to a remote server; and on a remote server:
updating state of the second file system in accordance with the flushed log file, maintaining a second identifier for each of the files flushed to the remote server, and maintaining a mapping table on the remote server that maintains a mapping between the first and second identifiers, enabling the remote server to serve the requests from the clients;

such that, whenever failover occurs from the local to the remote server, the remote server is able to serve the requests from the clients with little or no loss of file state.

43. A computer program product for providing geographical data replication, the computer program product including a computer readable storage medium and a computer program mechanism embedded therein, the computer program mechanism comprising:

local geographical data replication software that configures a local server to:
intercept file requests directed to a first file system;
determine which of the file requests is one of a first set of file requests that will alter file state of the first file system;
write to a persistent log file operations and data required to replicate changes to the file state of the first file system resulting from performing the first set of file requests;
maintain a first identifier for each file in the first file system, and
periodically flush the log file to a remote server; and remote geographical replication software that configures the remote server to:
update state of a second file system in accordance with the flushed log file by performing the operations on the data represented in the flushed log file, maintain a second identifier for each of the files flushed to the remote server, and maintain a mapping table on the remote server that maintains a mapping between the first and second identifiers, enabling the remote server to serve the requests from the clients;

such that, whenever failover occurs from the local to the remote server, the remote server is able to serve the requests from the clients with little or no loss of file state.

* * * * *